(12) United States Patent
Ye et al.

(10) Patent No.: US 9,304,291 B2
(45) Date of Patent: Apr. 5, 2016

(54) IMAGING LENS, AND ELECTRONIC APPARATUS INCLUDING THE SAME

(71) Applicant: Genius Electronic Optical Co., Ltd., Taichung (TW)

(72) Inventors: Long Ye, Fujian (CN); Kai-Lun Wang, Xiamen (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 14/340,733

(22) Filed: Jul. 25, 2014

(65) Prior Publication Data

US 2015/0253538 A1    Sep. 10, 2015

(30) Foreign Application Priority Data

Mar. 10, 2014    (CN) .......................... 2014 1 0085092

(51) Int. Cl.
*G02B 9/60* (2006.01)
*H04N 5/225* (2006.01)
*G02B 13/00* (2006.01)

(52) U.S. Cl.
CPC .............. *G02B 9/60* (2013.01); *G02B 13/0045* (2013.01); *H04N 5/2254* (2013.01)

(58) Field of Classification Search
CPC .............................. G02B 9/60; G02B 13/0045
See application file for complete search history.

(56) References Cited

U.S. PATENT DOCUMENTS

| | | | |
|---|---|---|---|
| 7,480,105 B2 | 1/2009 | Mori | |
| 7,486,449 B2 | 2/2009 | Miyano | |
| 7,639,432 B2 | 12/2009 | Asami | |
| 7,684,127 B2 | 3/2010 | Asami | |
| 8,456,758 B1 * | 6/2013 | Huang | ............... G02B 13/0045 359/714 |
| 8,514,501 B2 | 8/2013 | Chen et al. | |
| 8,537,472 B2 | 9/2013 | Tsai et al. | |
| 2013/0033764 A1 | 2/2013 | Tsai et al. | |
| 2013/0033765 A1 | 2/2013 | Tsai et al. | |
| 2013/0050847 A1 | 2/2013 | Hsu et al. | |
| 2013/0188263 A1 | 7/2013 | Tsai et al. | |

FOREIGN PATENT DOCUMENTS

| | | |
|---|---|---|
| CN | 102955223 | 3/2013 |
| TW | 201305652 A1 | 2/2013 |
| TW | 201326956 A1 | 7/2013 |
| TW | 201329502 A1 | 7/2013 |
| TW | 201339632 A | 10/2013 |
| TW | 201348736 A | 12/2013 |

OTHER PUBLICATIONS

"Office Action of China Counterpart Application," issued on Dec. 21, 2015, p. 1-p. 6.

* cited by examiner

*Primary Examiner* — Joseph P Martinez
(74) *Attorney, Agent, or Firm* — Jianq Chyun IP Office

(57) ABSTRACT

An imaging lens includes first to fifth lens elements arranged from an object side to an image side in the given order. Through designs of surfaces of the lens elements and relevant lens parameters, a short system length of the imaging lens may be achieved while maintaining good optical performance.

19 Claims, 32 Drawing Sheets system focal length =2.6385mm, half field-of-view =40.425°, F-number =2.05, system length =3.9041mm

| lens element | surface | radius of curvature | thickness | refractive index | Abbe number | focal length | material |
|---|---|---|---|---|---|---|---|
| object | | ∞ | 300.0000 | | | | |
| aperture stop 2 | | ∞ | -0.0700 | | | | |
| first lens element 3 | object-side surface 31 | 1.8887 | 0.4924 | 1.544 | 56.114 | 4.131 | plastic |
| | image-side surface 32 | 10.5455 | 0.1090 | | | | |
| second lens element 4 | object-side surface 41 | 4.2016 | 0.2249 | 1.640 | 23.529 | -3.325 | plastic |
| | image-side surface 42 | 1.3894 | 0.0675 | | | | |
| third lens element 5 | object-side surface 51 | 1.3431 | 0.3445 | 1.544 | 56.114 | 3.372 | plastic |
| | image-side surface 52 | 4.5179 | 0.3097 | | | | |
| fourth lens element 6 | object-side surface 61 | -1.7616 | 0.5854 | 1.544 | 56.114 | 2.566 | plastic |
| | image-side surface 62 | -0.8720 | 0.0990 | | | | |
| fifth lens element 7 | object-side surface 71 | 1.5239 | 0.5283 | 1.544 | 56.114 | -3.453 | plastic |
| | image-side surface 72 | 0.7395 | 0.7219 | | | | |
| optical filter 8 | object-side surface 81 | ∞ | 0.2100 | | | | |
| | image-side surface 82 | ∞ | 0.2114 | | | | |
| image plane 100 | | ∞ | | | | | |

FIG.3

| surface | 31 | 32 | 41 | 42 | 51 |
|---|---|---|---|---|---|
| K | -1.25058 | 0 | -349.512 | -29.6166 | -20.6658 |
| a4 | 0.048259 | -0.38385 | -0.41145 | -0.16332 | 0.104392 |
| a6 | -0.59341 | 0.877513 | 1.08696 | 1.088485 | -0.18483 |
| a8 | 2.599133 | -2.12598 | -2.36604 | -3.11735 | 0.028178 |
| a10 | -5.15008 | 0.938027 | 1.089712 | 4.911175 | 0.280183 |
| a12 | -0.53932 | -0.86561 | -3.86741 | -5.66716 | -0.29178 |
| a14 | 14.03623 | 6.71362 | 14.53641 | 4.365443 | -0.41178 |
| a16 | -13.0792 | -6.43137 | -11.4445 | -1.52971 | 0.414082 |
| surface | 52 | 61 | 62 | 71 | 72 |
| K | 0 | -13.1536 | -1.26315 | -5.24452 | -3.737242 |
| a4 | 0.070719 | 0.010246 | 0.148364 | -0.21315 | -0.15146235 |
| a6 | -0.15743 | 0.138062 | -0.13576 | 0.131662 | 0.10471982 |
| a8 | -0.05711 | -0.00062 | 0.137929 | -0.05576 | -0.057088882 |
| a10 | 0.059285 | -0.16185 | 0.044063 | 0.010466 | 0.020469999 |
| a12 | 0.265309 | -0.01146 | -0.0008 | 0.002891 | -0.00466351 |
| a14 | -0.54375 | 0.119576 | -0.07423 | -0.00174 | 0.000610102 |
| a16 | 0.278334 | -0.05477 | 0.028733 | 0.000225 | -3.53759E-05 |

FIG.4 system focal length =2.6174mm, half field-of-view =40.650°, F-number =2.05, system length =3.8859mm

| lens element | surface | radius of curvature | thickness | refractive index | Abbe number | focal length | material |
|---|---|---|---|---|---|---|---|
| object | | ∞ | 300.0000 | | | | |
| aperture stop 2 | | ∞ | -0.0700 | | | | |
| first lens element 3 | object-side surface 31 | 1.8887 | 0.5113 | 1.544 | 56.114 | 4.128 | plastic |
| | image-side surface 32 | 10.5455 | 0.1018 | | | | |
| second lens element 4 | object-side surface 41 | 4.2016 | 0.1941 | 1.640 | 23.529 | -3.31 | plastic |
| | image-side surface 42 | 1.3894 | 0.0582 | | | | |
| third lens element 5 | object-side surface 51 | 1.3431 | 0.4339 | 1.544 | 56.114 | 3.34 | plastic |
| | image-side surface 52 | 4.5179 | 0.2894 | | | | |
| fourth lens element 6 | object-side surface 61 | -1.7616 | 0.5553 | 1.544 | 56.114 | 2.592 | plastic |
| | image-side surface 62 | -0.8720 | 0.0733 | | | | |
| fifth lens element 7 | object-side surface 71 | 1.5239 | 0.5480 | 1.544 | 56.114 | -3.493 | plastic |
| | image-side surface 72 | 0.7395 | 0.7369 | | | | |
| optical filter 8 | object-side surface 81 | ∞ | 0.2100 | | | | |
| | image-side surface 82 | ∞ | 0.1737 | | | | |
| image plane 100 | | ∞ | | | | | |

FIG.7

| surface | 31 | 32 | 41 | 42 | 51 |
|---|---|---|---|---|---|
| K | -1.25058 | 0 | -349.512 | -29.6166 | -20.6658 |
| a4 | 0.041629 | -0.38077 | -0.39276 | -0.16417 | 0.090995 |
| a6 | -0.58486 | 0.870191 | 1.115721 | 1.110383 | -0.18553 |
| a8 | 2.56306 | -2.13368 | -2.34538 | -3.09887 | 0.030199 |
| a10 | -5.13958 | 0.942333 | 1.066189 | 4.816563 | 0.288627 |
| a12 | -0.50134 | -0.85182 | -3.95181 | -5.64372 | -0.28773 |
| a14 | 14.2852 | 6.958231 | 14.44963 | 4.435266 | -0.41345 |
| a16 | -13.4986 | -6.71434 | -11.304 | -1.5968 | 0.409132 |
| surface | 52 | 61 | 62 | 71 | 72 |
| K | 0 | -13.1536 | -1.26315 | -5.24452 | -3.737242 |
| a4 | 0.076409 | 0.010321 | 0.130111 | -0.2146 | -0.14686611 |
| a6 | -0.13072 | 0.125174 | -0.11657 | 0.135698 | 0.10396848 |
| a8 | -0.09264 | 0.020034 | 0.123919 | -0.05669 | -0.057004537 |
| a10 | 0.062105 | -0.17199 | 0.051374 | 0.010279 | 0.020491926 |
| a12 | 0.295976 | -0.0136 | -0.00117 | 0.002918 | -0.004641992 |
| a14 | -0.52532 | 0.116279 | -0.07867 | -0.00173 | 0.000600045 |
| a16 | 0.253032 | -0.0518 | 0.03063 | 0.000215 | -3.45E-05 |

FIG.8

FIG.11 system focal length =2.7389mm, half field-of-view =39.421°, F-number =2.05, system length =4.1354mm

| lens element | surface | radius of curvature | thickness | refractive index | Abbe number | focal length | material |
|---|---|---|---|---|---|---|---|
| object | | ∞ | 300.0000 | | | | |
| aperture stop 2 | | ∞ | -0.0700 | | | | |
| first lens element 3 | object-side surface 31 | 1.8887 | 0.4535 | 1.544 | 56.114 | 4.138 | plastic |
| | image-side surface 32 | 10.5455 | 0.1020 | | | | |
| second lens element 4 | object-side surface 41 | 4.2016 | 0.2499 | 1.640 | 23.529 | -3.337 | plastic |
| | image-side surface 42 | 1.3894 | 0.1599 | | | | |
| third lens element 5 | object-side surface 51 | 1.3431 | 0.3498 | 1.544 | 56.114 | 3.37 | plastic |
| | image-side surface 52 | 4.5179 | 0.3006 | | | | |
| fourth lens element 6 | object-side surface 61 | -1.7616 | 0.6950 | 1.544 | 56.114 | 2.479 | plastic |
| | image-side surface 62 | -0.8720 | 0.0600 | | | | |
| fifth lens element 7 | object-side surface 71 | 1.5239 | 0.4990 | 1.544 | 56.114 | -3.394 | plastic |
| | image-side surface 72 | 0.7395 | 0.8879 | | | | |
| optical filter 8 | object-side surface 81 | ∞ | 0.2100 | | | | |
| | image-side surface 82 | ∞ | 0.1679 | | | | |
| image plane 100 | | ∞ | | | | | |

| surface | 31 | 32 | 41 | 42 | 51 |
|---|---|---|---|---|---|
| K | -1.25058 | 0 | -349.512 | -29.6166 | -20.6658 |
| a4 | 0.006174 | -0.44067 | -0.51874 | -0.19991 | 0.12439 |
| a6 | -0.25448 | 1.628621 | 1.630671 | 1.070038 | -0.43506 |
| a8 | 1.972845 | -3.26849 | -2.32627 | -2.72501 | 0.327903 |
| a10 | -4.80972 | 1.793812 | 0.726056 | 4.369754 | 0.136255 |
| a12 | -0.01444 | -1.06559 | -5.13722 | -5.61388 | -0.35659 |
| a14 | 13.85504 | 5.173052 | 14.48788 | 4.764183 | -0.32066 |
| a16 | -13.5717 | -4.68706 | -9.64525 | -1.73718 | 0.374623 |
| surface | 52 | 61 | 62 | 71 | 72 |
| K | 0 | -13.1536 | -1.26315 | -5.24452 | -3.737242 |
| a4 | -0.07727 | -0.10524 | 0.105886 | -0.19199 | -0.13755142 |
| a6 | 0.157305 | 0.181849 | -0.09969 | 0.133912 | 0.10022582 |
| a8 | -0.20932 | 0.161457 | 0.054842 | -0.06666 | -0.057813353 |
| a10 | -0.06555 | -0.20383 | 0.035442 | 0.008198 | 0.020611258 |
| a12 | 0.374075 | -0.08945 | 0.024607 | 0.004343 | -0.004565491 |
| a14 | -0.49671 | 0.107172 | -0.06019 | -0.0012 | 0.000602481 |
| a16 | 0.212502 | -0.0168 | 0.0194 | 5.26E-05 | -3.64E-05 |

FIG.12 system focal length =2.7359mm, half field-of-view =39.385°, F-number =2.05, system length =4.0700mm

| lens element | surface | radius of curvature | thickness | refractive index | Abbe number | focal length | material |
|---|---|---|---|---|---|---|---|
| object | | ∞ | 300.0000 | | | | |
| aperture stop 2 | | ∞ | -0.0700 | | | | |
| first lens element 3 | object-side surface 31 | 1.8887 | 0.5331 | 1.544 | 56.114 | 4.125 | plastic |
| | image-side surface 32 | 10.5455 | 0.1036 | | | | |
| second lens element 4 | object-side surface 41 | 4.2016 | 0.2500 | 1.640 | 23.529 | -3.337 | plastic |
| | image-side surface 42 | 1.3894 | 0.1129 | | | | |
| third lens element 5 | object-side surface 51 | 1.3431 | 0.3500 | 1.544 | 56.114 | 3.37 | plastic |
| | image-side surface 52 | 4.5179 | 0.2608 | | | | |
| fourth lens element 6 | object-side surface 61 | -1.7616 | 0.6482 | 1.544 | 56.114 | 2.516 | plastic |
| | image-side surface 62 | -0.8720 | 0.1377 | | | | |
| fifth lens element 7 | object-side surface 71 | 1.5239 | 0.4676 | 1.544 | 56.114 | -3.333 | plastic |
| | image-side surface 72 | 0.7395 | 0.7634 | | | | |
| optical filter 8 | object-side surface 81 | ∞ | 0.2100 | | | | |
| | image-side surface 82 | ∞ | 0.2328 | | | | |
| image plane 100 | | | | | | | |

FIG.15

| surface | 31 | 32 | 41 | 42 | 51 |
|---|---|---|---|---|---|
| K | -1.25058 | 0 | -349.512 | -29.6166 | -20.6658 |
| a4 | 0.043552 | -0.40867 | -0.44598 | -0.20878 | 0.047963 |
| a6 | -0.49322 | 1.22689 | 1.146301 | 1.056428 | -0.18911 |
| a8 | 2.407371 | -2.66271 | -2.01317 | -2.83359 | 0.055991 |
| a10 | -4.67161 | 1.389239 | 1.055449 | 4.699251 | 0.319067 |
| a12 | -0.73914 | -0.72549 | -4.76647 | -5.84331 | -0.29909 |
| a14 | 12.65435 | 6.013906 | 14.24426 | 4.61407 | -0.43788 |
| a16 | -11.1244 | -6.05773 | -10.4063 | -1.58258 | 0.38267 |
| surface | 52 | 61 | 62 | 71 | 72 |
| K | 0 | -13.1536 | -1.26315 | -5.24452 | -3.737242 |
| a4 | -0.00818 | -0.07085 | 0.122874 | -0.20517 | -0.14622368 |
| a6 | -0.04658 | 0.178858 | -0.12319 | 0.147352 | 0.105553557 |
| a8 | -0.05946 | 0.093724 | 0.122575 | -0.06093 | -0.055931724 |
| a10 | 0.05351 | -0.16471 | 0.044714 | 0.007918 | 0.019630475 |
| a12 | 0.277959 | -0.04019 | 0.003995 | 0.003253 | -0.004516684 |
| a14 | -0.52691 | 0.099632 | -0.06836 | -0.00123 | 0.000613672 |
| a16 | 0.224481 | -0.04514 | 0.024815 | 0.000117 | -3.63E-05 |

FIG.16 system focal length =2.6899mm, half field-of-view =39.812°, F-number =2.05, system length =3.9004mm

| lens element | surface | radius of curvature | thickness | refractive index | Abbe number | focal length | material |
|---|---|---|---|---|---|---|---|
| object | | ∞ | 300.0000 | | | | |
| aperture stop 2 | | ∞ | -0.0700 | | | | |
| first lens element 3 | object-side surface 31 | 1.8887 | 0.4636 | 1.544 | 56.114 | 4.136 | plastic |
| | image-side surface 32 | 10.5455 | 0.0819 | | | | |
| second lens element 4 | object-side surface 41 | 4.2016 | 0.2500 | 1.640 | 23.529 | -3.337 | plastic |
| | image-side surface 42 | 1.3894 | 0.0600 | | | | |
| third lens element 5 | object-side surface 51 | 1.3431 | 0.4799 | 1.544 | 56.114 | 3.323 | plastic |
| | image-side surface 52 | 4.5179 | 0.3201 | | | | |
| fourth lens element 6 | object-side surface 61 | -1.7616 | 0.5151 | 1.544 | 56.114 | 2.626 | plastic |
| | image-side surface 62 | -0.8720 | 0.0602 | | | | |
| fifth lens element 7 | object-side surface 71 | 1.5239 | 0.5194 | 1.544 | 56.114 | -3.435 | plastic |
| | image-side surface 72 | 0.7395 | 0.7209 | | | | |
| optical filter 8 | object-side surface 81 | ∞ | 0.2100 | | | | |
| | image-side surface 82 | ∞ | 0.2193 | | | | |
| image plane 100 | | ∞ | | | | | |

FIG.19

| surface | 31 | 32 | 41 | 42 | 51 |
|---|---|---|---|---|---|
| K | -1.25058 | 0 | -349.512 | -29.6166 | -20.6658 |
| a4 | -0.03034 | -0.42081 | -0.38844 | -0.25006 | 0.014534 |
| a6 | -0.11947 | 1.105302 | 1.006989 | 1.052578 | -0.16266 |
| a8 | 1.283638 | -2.7025 | -1.98363 | -2.78066 | 0.063889 |
| a10 | -3.36051 | 1.550886 | 1.079133 | 4.611719 | 0.370318 |
| a12 | -1.61979 | -0.81361 | -4.61253 | -5.79351 | -0.54374 |
| a14 | 13.50099 | 5.871113 | 14.38828 | 4.510678 | -0.25004 |
| a16 | -11.8897 | -5.64566 | -10.7308 | -1.55813 | 0.368378 |
| surface | 52 | 61 | 62 | 71 | 72 |
| K | 0 | -13.1536 | -1.26315 | -5.24452 | -3.737242 |
| a4 | 0.053966 | -0.02487 | 0.126925 | -0.22674 | -0.15682649 |
| a6 | -0.10761 | 0.057287 | -0.1075 | 0.142245 | 0.10904341 |
| a8 | -0.08586 | 0.131617 | 0.114194 | -0.05607 | -0.057551848 |
| a10 | 0.060272 | -0.16758 | 0.050356 | 0.006611 | 0.01991916 |
| a12 | 0.281555 | -0.03191 | 0.006517 | 0.003435 | -0.004482402 |
| a14 | -0.52483 | 0.092068 | -0.06915 | -0.00128 | 0.000578333 |
| a16 | 0.235126 | -0.05758 | 0.024754 | 0.000127 | -3.33E-05 |

FIG.20

| system focal length =2.7384mm, half field-of-view =39.418°, F-number =2.05, system length =4.1644mm ||||||||
|---|---|---|---|---|---|---|---|
| lens element | surface | | radius of curvature | thickness | refractive index | Abbe number | focal length | material |
| object | | | ∞ | 300.0000 | | | | |
| aperture stop 2 | | | ∞ | -0.0700 | | | | |
| first lens element 3 | object-side surface 31 | 1.9615 | 0.4494 | 1.544 | 56.114 | 4.001 | plastic |
| | image-side surface 32 | 17.6821 | 0.0960 | | | | |
| second lens element 4 | object-side surface 41 | 5.2309 | 0.2499 | 1.640 | 23.529 | -3.727 | plastic |
| | image-side surface 42 | 1.6155 | 0.1930 | | | | |
| third lens element 5 | object-side surface 51 | 1.5158 | 0.3498 | 1.544 | 56.114 | 3.907 | plastic |
| | image-side surface 52 | 4.8113 | 0.3051 | | | | |
| fourth lens element 6 | object-side surface 61 | -1.7611 | 0.6946 | 1.544 | 56.114 | 2.422 | plastic |
| | image-side surface 62 | -0.8605 | 0.0600 | | | | |
| fifth lens element 7 | object-side surface 71 | 1.5469 | 0.4926 | 1.544 | 56.114 | -3.284 | plastic |
| | image-side surface 72 | 0.7370 | 0.9127 | | | | |
| optical filter 8 | object-side surface 81 | ∞ | 0.2100 | | | | |
| | image-side surface 82 | ∞ | 0.1513 | | | | |
| image plane 100 | | | | | | | |

FIG.23

| surface | 31 | 32 | 41 | 42 | 51 |
|---|---|---|---|---|---|
| K | -1.3804 | 0 | -558.672 | -32.1986 | -21.7963 |
| a4 | 0.003079 | -0.44074 | -0.51545 | -0.20565 | 0.1133 |
| a6 | -0.26579 | 1.63617 | 1.635882 | 1.066256 | -0.44247 |
| a8 | 1.971276 | -3.26247 | -2.31939 | -2.72515 | 0.324329 |
| a10 | -4.79064 | 1.78997 | 0.734225 | 4.373387 | 0.135808 |
| a12 | 0.007337 | -1.07502 | -5.13449 | -5.61057 | -0.35574 |
| a14 | 13.85037 | 5.175221 | 14.48689 | 4.763608 | -0.31996 |
| a16 | -13.6857 | -4.64283 | -9.65745 | -1.74339 | 0.373988 |
| surface | 52 | 61 | 62 | 71 | 72 |
| K | 0 | -11.4866 | -1.26269 | -4.77485 | -3.608603 |
| a4 | -0.08144 | -0.10557 | 0.105215 | -0.19365 | -0.13680452 |
| a6 | 0.154426 | 0.182775 | -0.10039 | 0.13333 | 0.10024791 |
| a8 | -0.20979 | 0.1615 | 0.054342 | -0.06676 | -0.05783367 |
| a10 | -0.06539 | -0.20403 | 0.035194 | 0.008199 | 0.020605009 |
| a12 | 0.374094 | -0.08975 | 0.024466 | 0.004348 | -0.004566176 |
| a14 | -0.49716 | 0.106996 | -0.06027 | -0.0012 | 0.000602479 |
| a16 | 0.211891 | -0.01688 | 0.019357 | 5.30E-05 | -3.63E-05 |

| system focal length =2.5570mm , half field-of-view =41.121°, F-number =2.05 system length =3.8139mm |||||||
|---|---|---|---|---|---|---|
| lens element | surface | radius of curvature | thickness | refractive index | Abbe number | focal length | material |
| object | | ∞ | 300.0000 | | | | |
| aperture stop 2 | | ∞ | -0.0400 | | | | |
| first lens element 3 | object-side surface 31 | 2.2931 | 0.5373 | 1.544 | 56.114 | 2.712 | plastic |
| | image-side surface 32 | -3.8342 | 0.0873 | | | | |
| second lens element 4 | object-side surface 41 | 58.2304 | 0.2290 | 1.640 | 23.529 | -3.322 | plastic |
| | image-side surface 42 | 2.0622 | 0.0906 | | | | |
| third lens element 5 | object-side surface 51 | 2.2077 | 0.3342 | 1.535 | 55.712 | 6.547 | plastic |
| | image-side surface 52 | 5.6242 | 0.1583 | | | | |
| fourth lens element 6 | object-side surface 61 | -2.0324 | 0.6437 | 1.535 | 55.712 | 2.224 | plastic |
| | image-side surface 62 | -0.8352 | 0.2399 | | | | |
| fifth lens element 7 | object-side surface 71 | 2.0837 | 0.4925 | 1.531 | 55.744 | -2.548 | plastic |
| | image-side surface 72 | 0.7545 | 0.6000 | | | | |
| optical filter 8 | object-side surface 81 | ∞ | 0.2100 | | | | |
| | image-side surface 82 | ∞ | 0.1911 | | | | |
| image plane 100 | | ∞ | | | | | |

| surface | 31 | 32 | 41 | 42 | 51 |
|---|---|---|---|---|---|
| K | -1.98621 | -80.274 | -1057.3 | -22.3332 | -20.7873 |
| a4 | -0.01094 | -0.21615 | -0.04457 | 0.032506 | -0.1664 |
| a6 | -0.27002 | -0.07256 | -0.38019 | 0.099549 | 0.075709 |
| a8 | 0.636639 | -0.15898 | 0.217682 | -0.59075 | 0.059667 |
| a10 | -0.9837 | -0.25048 | -0.45532 | 0.488929 | -0.03537 |
| a12 | -0.32964 | 0.636554 | -0.29969 | 0.080987 | -0.15221 |
| a14 | 0.051586 | 0.312276 | 3.673763 | -0.148 | 0.235825 |
| a16 | 1.4444 | -0.43232 | -3.02067 | 0.002353 | -0.08781 |
| surface | 52 | 61 | 62 | 71 | 72 |
| K | 0 | -7.87988 | -0.87291 | -2.40705 | -3.847707 |
| a4 | -0.0216 | 0.201269 | 0.346394 | -0.23268 | -0.11452123 |
| a6 | -0.09077 | -0.02262 | -0.34142 | 0.055926 | 0.048948105 |
| a8 | -0.05872 | -0.14508 | 0.278858 | 0.001525 | -0.014921816 |
| a10 | -0.01545 | 0.000836 | 0.019133 | -0.00569 | 0.001840525 |
| a12 | 0.053424 | 0.037043 | -0.05312 | -0.00058 | 0.000190381 |
| a14 | 0 | 0.029085 | -0.02595 | 0.00065 | -8.90E-05 |
| a16 | 0 | -0.01918 | 0.020793 | 5.30E-05 | 7.41E-06 |

FIG.28

| relationship | first preferred embodiment | second preferred embodiment | third preferred embodiment | fourth preferred embodiment | fifth preferred embodiment | sixth preferred embodiment | seventh preferred embodiment |
|---|---|---|---|---|---|---|---|
| T4/G34 | 1.890 | 1.919 | 2.312 | 2.486 | 1.609 | 2.277 | 4.066 |
| T5/T4 | 0.903 | 0.987 | 0.718 | 0.721 | 1.008 | 0.709 | 0.765 |
| BFL/(G12+G45) | 5.494 | 6.401 | 7.817 | 4.999 | 8.095 | 8.164 | 3.060 |
| T3/G23 | 5.104 | 7.452 | 2.188 | 3.101 | 7.998 | 1.812 | 3.688 |
| T3/G34 | 1.112 | 1.500 | 1.164 | 1.342 | 1.499 | 1.147 | 2.111 |
| T1/Gaa | 0.841 | 0.978 | 0.729 | 0.867 | 0.888 | 0.687 | 0.933 |
| T2/G23 | 3.332 | 3.333 | 1.563 | 2.215 | 4.167 | 1.295 | 2.528 |
| ALT/T1 | 4.418 | 4.386 | 4.955 | 4.219 | 4.806 | 4.977 | 4.163 |
| T1/G23 | 7.296 | 8.781 | 2.836 | 4.723 | 7.726 | 2.328 | 5.931 |
| (G12+G45)/G23 | 3.083 | 3.007 | 1.013 | 2.138 | 2.368 | 0.808 | 3.611 |
| BFL/T5 | 2.164 | 2.045 | 2.537 | 2.580 | 2.214 | 2.586 | 2.033 |
| Gaa/(G12+G45) | 2.813 | 2.985 | 3.844 | 2.549 | 3.675 | 4.192 | 1.761 |
| T5/G23 | 7.828 | 9.410 | 3.121 | 4.142 | 8.657 | 2.552 | 5.436 |
| Gaa/T2 | 2.602 | 2.693 | 2.491 | 2.460 | 2.089 | 2.617 | 2.515 |
| T4/G23 | 8.674 | 9.537 | 4.346 | 5.743 | 8.585 | 3.599 | 7.104 |
| ALT/G23 | 32.235 | 38.513 | 14.053 | 19.923 | 37.133 | 11.586 | 24.687 |

FIG.30

IMAGING LENS, AND ELECTRONIC APPARATUS INCLUDING THE SAME

CROSS-REFERENCE TO RELATED APPLICATION

This application claims priority to Chinese Application No. 201410085092.8, filed on Mar. 10, 2014.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

However, the conventional imaging lens with four lens elements is insufficient to satisfy consumer expectations of high image quality. It is desirable to develop an imaging lens that has a relatively small size and relatively high image quality.

Each of U.S. Pat. Nos. 7,480,105, 7,639,432, 7,486,449 and 7,684,127 discloses a type of an imaging lens that includes five lens elements. In each of U.S. Pat. Nos. 7,480,105 and 7,639,432, the first two lens elements of the imaging lens disclosed therein respectively have a negative refractive power and a positive refractive power. In each of U.S. Pat. Nos. 7,486,449 and 7,684,127, both of the first two lens elements of the imaging lens disclosed therein have a negative refractive power. However, the aforesaid arrangement of the first two lens elements is unable to achieve good optical performance. Beside, the imaging lenses disclosed in the aforesaid patents have a system length ranging between 10 mm and 18 mm, which disfavors reducing thickness of portable electronic devices.

Reducing the system length of the imaging lens while maintaining satisfactory optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises an aperture stop, a first lens element, a second lens element, a third lens element, a fourth lens element and a fifth lens element arranged in order from an object side to an image side along an optical axis of the imaging lens. Each of the first lens element, the second lens element, the third lens element, the fourth lens element and the fifth lens element has a refractive power, an object-side surface facing toward the object side, and an image-side surface facing toward the image side.

The first lens element has a positive refractive power, and the object-side surface of the first lens element is a convex surface that has a convex portion in a vicinity of the optical axis and a convex portion in a vicinity of a periphery of the first lens element.

The second lens element has a negative refractive power, and the object-side surface of the second lens element has a concave portion in a vicinity of a periphery of the second lens element.

The image-side surface of the third lens element has a concave portion in a vicinity of the optical axis.

The object-side surface of the fourth lens element has a concave portion in a vicinity of a periphery of the fourth lens element, and the image-side surface of the fourth lens element has a convex portion in a vicinity of the optical axis.

The object-side surface of the fifth lens element has a convex portion in a vicinity of the optical axis, and the image-side surface of the fifth lens element has a concave portion in a vicinity of the optical axis, and a convex portion in a vicinity of a periphery of the fifth lens element.

The imaging lens does not include any lens element with a refractive power other than the first lens element, the second lens element, the third lens element, the fourth lens element and the fifth lens element.

The imaging lens satisfies $T4/G34 \geq 1.60$, where $T4$ represents a thickness of the fourth lens element at the optical axis, and $G34$ represents an air gap width between the third lens element and the fourth lens element at the optical axis.

Another object of the present invention is to provide an electronic apparatus having an imaging lens with five lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical data corresponding to the imaging lens of the first preferred embodiment;

FIG. 4 shows values of some aspherical coefficients corresponding to the imaging lens of the first preferred embodiment;

FIG. 7 shows values of some optical data corresponding to the imaging lens of the second preferred embodiment;

FIG. 8 shows values of some aspherical coefficients corresponding to the imaging lens of the second preferred embodiment;

FIG. 11 shows values of some optical data corresponding to the imaging lens of the third preferred embodiment;

FIG. 12 shows values of some aspherical coefficients corresponding to the imaging lens of the third preferred embodiment;

FIG. 15 shows values of some optical data corresponding to the imaging lens of the fourth preferred embodiment;

FIG. 16 shows values of some aspherical coefficients corresponding to the imaging lens of the fourth preferred embodiment;

FIG. 19 shows values of some optical data corresponding to the imaging lens of the fifth preferred embodiment;

FIG. 20 shows values of some aspherical coefficients corresponding to the imaging lens of the fifth preferred embodiment;

FIG. 23 shows values of some optical data corresponding to the imaging lens of the sixth preferred embodiment;

FIG. 24 shows values of some aspherical coefficients corresponding to the imaging lens of the sixth preferred embodiment;

FIG. 27 shows values of some optical data corresponding to the imaging lens of the seventh preferred embodiment;

FIG. 28 shows values of some aspherical coefficients corresponding to the imaging lens of the seventh preferred embodiment;

FIG. 30 is a table that lists values of relationships among some lens parameters corresponding to the imaging lenses of the first to seventh preferred embodiments;

DETAILED DESCRIPTION OF THE PREFERRED EMBODIMENTS

Figure 1:
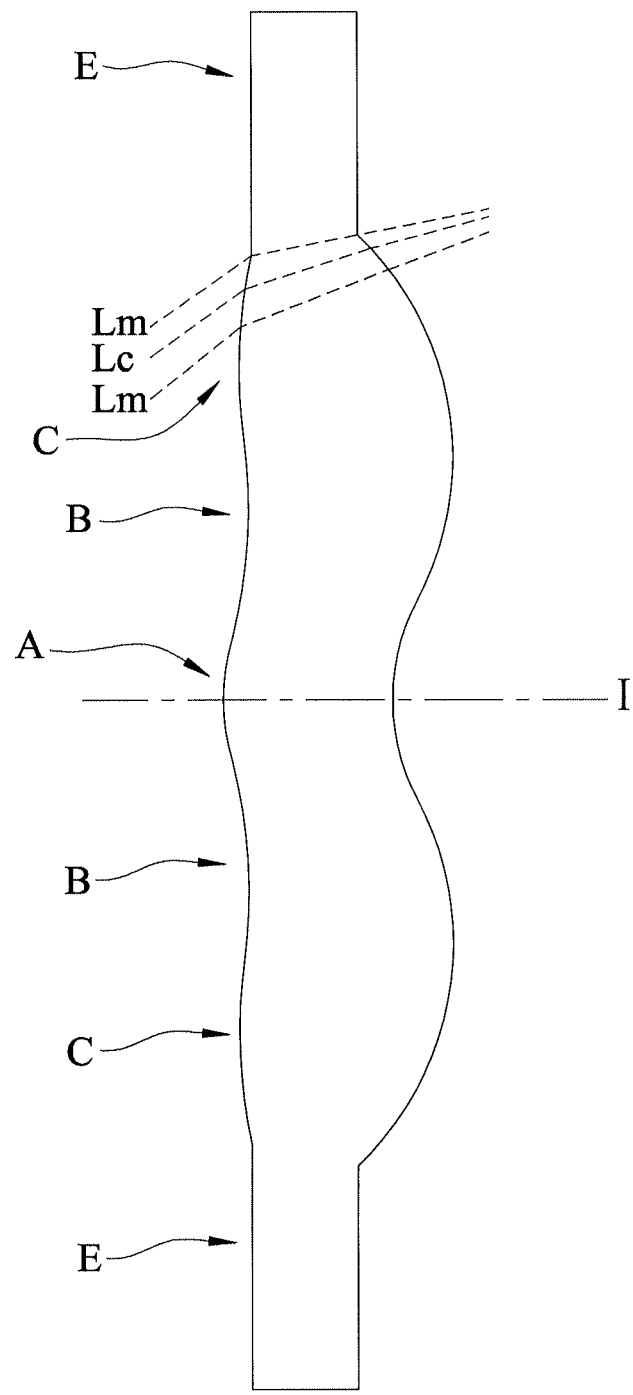
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
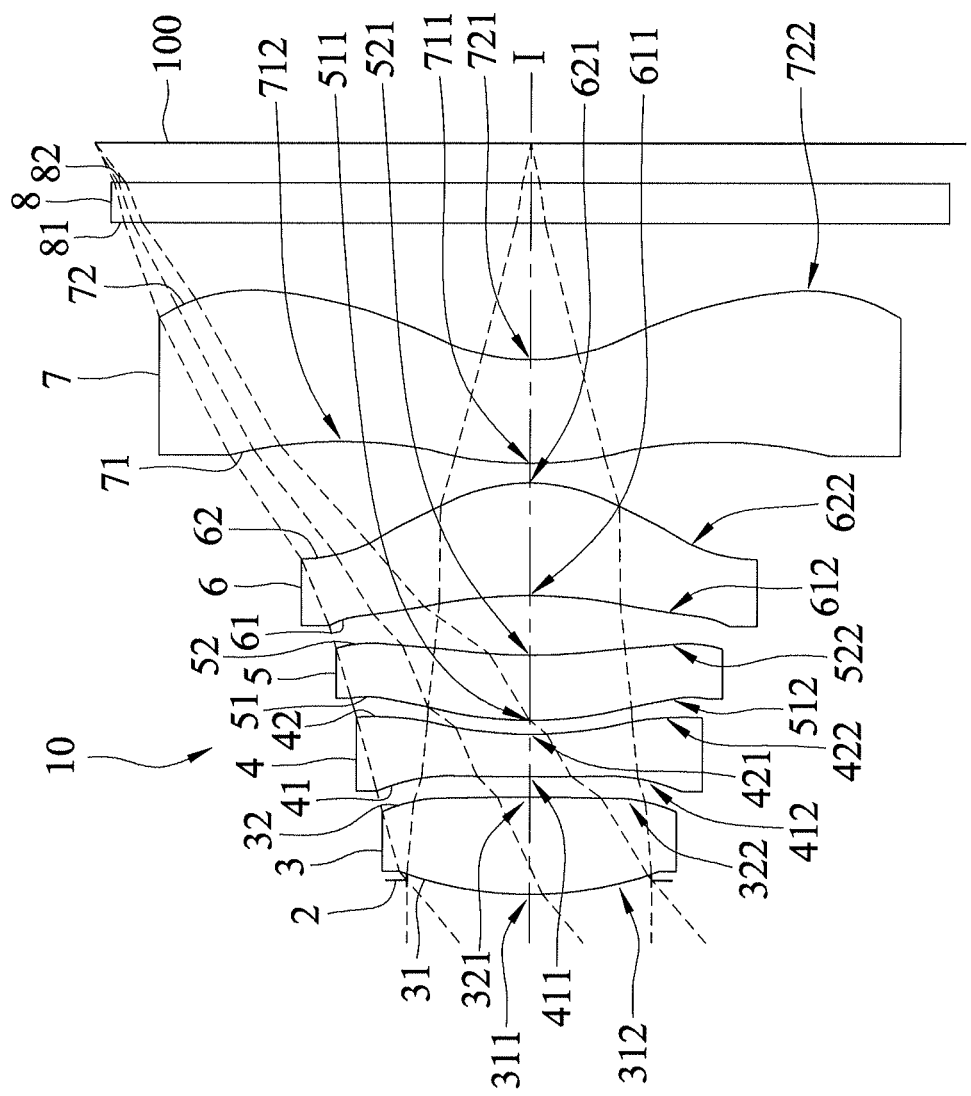
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, a first lens element 3, a second lens element 4, a third lens element 5, a fourth lens element 6, a fifth lens element 7, and an optical filter 8 arranged in the given order along an optical axis (I) from an object side to an image side. The optical filter 8 is an infrared cut filter for selectively absorbing infrared light to thereby reduce imperfection of images formed at an image plane 100.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 100. Each of the object-side surfaces 31, 41, 51, 61, 71 and the image-side surfaces 32, 42, 52, 62, 72 is aspherical and has a center point coinciding with the optical axis (I).

Each of the lens elements 3-7 is made of a plastic material and has a refractive power in this embodiment. However, at least one of the lens elements 3-7 may be made of other materials in other embodiments.

In the first preferred embodiment, which is depicted in FIG. 2, the first lens element 3 has a positive refractive power. The object-side surface 31 of the first lens element 3 is a convex surface that has a convex portion 311 in a vicinity of the optical axis (I) and that has a convex portion 312 in a vicinity of a periphery of the first lens element 3. The image-side surface 32 of the first lens element 3 has a concave portion 321 in a vicinity of the optical axis (I), and a convex portion 322 in a vicinity of the periphery of the first lens element 3.

The second lens element 4 has a negative refractive power. The object-side surface 41 of the second lens element 4 has a convex portion 411 in a vicinity of the optical axis (I), and a concave portion 412 in a vicinity of a periphery of the second lens element 4. The image-side surface 42 of the second lens element 4 has a concave portion 421 in a vicinity of the optical axis (I), and a convex portion 422 in a vicinity of the periphery of the second lens element 4.

The third lens element 5 has a positive refractive power. The object-side surface 51 of the third lens element 5 has a convex portion 511 in a vicinity of the optical axis (I), and a concave portion 512 in a vicinity of a periphery of the third lens element 5. The image-side surface 52 of the third lens element 5 has a concave portion 521 in a vicinity of the optical axis (I), and a convex portion 522 in a vicinity of the periphery of the third lens element 5.

The fourth lens element 6 has a positive refractive power. The object-side surface 61 of the fourth lens element 6 is a concave surface that has a concave portion 611 in a vicinity of the optical axis (I), and a concave portion 612 in a vicinity of a periphery of the fourth lens element 6. The image-side surface 62 of the fourth lens element 6 is a convex surface that has a convex portion 621 in a vicinity of the optical axis (I), and a convex portion 622 in a vicinity of the periphery of the fourth lens element 6.

The fifth lens element 7 has a negative refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

In the first preferred embodiment, the imaging lens 10 does not include any lens element with a refractive power other than the aforesaid lens elements 3-7.

Shown in FIG. 3 is a table that lists values of some optical data corresponding to the surfaces 31-81, 32-82 of the first preferred embodiment. The imaging lens 10 has an overall system effective focal length (EFL) of 2.6385 mm, a half field-of-view (HFOV) of 40.425°, an F-number of 2.05, and a system length of 3.9041 mm. The system length refers to a distance between the object-side surface 31 of the first lens element 3 and the image plane 100 at the optical axis (I).

In this embodiment, each of the object-side surfaces 31-71 and the image-side surfaces 32-72 is aspherical, and satisfies the relationship of $$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \quad (1)$$

where:
R represents a radius of curvature of an aspherical surface;
Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);
Y represents a perpendicular distance between the arbitrary point on the aspherical surface and the optical axis (I);
K represents a conic constant; and
$a_{2i}$ represents a $2i^{th}$ aspherical coefficient.

Shown in FIG. 4 is a table that lists values of some aspherical coefficients of the aforementioned relationship (1) corresponding to the first preferred embodiment.

Relationships among some of the lens parameters corresponding to the first preferred embodiment are listed in a column of FIG. 30 corresponding to the first preferred embodiment, where:

T1 represents a thickness of the first lens element 3 at the optical axis (I);
T2 represents a thickness of the second lens element 4 at the optical axis (I);
T3 represents a thickness of the third lens element 5 at the optical axis (I);
T4 represents a thickness of the fourth lens element 6 at the optical axis (I);
T5 represents a thickness of the fifth lens element 7 at the optical axis (I);
G12 represents an air gap width between the first lens element 3 and the second lens element 4 at the optical axis (I);
G23 represents an air gap width between the second lens element 4 and the third lens element 5 at the optical axis (I);
G34 represents an air gap width between the third lens element 5 and the fourth lens element 6 at the optical axis (I);
G45 represents an air gap width between the fourth lens element 6 and the fifth lens element 7 at the optical axis (I);
ALT represents a sum of thicknesses of the lens elements 3-7 at the optical axis (I), i.e., the sum of T1, T2, T3, T4, and T5;
Gaa represents a sum of four air gap widths among the first lens element 3, the second lens element 4, the third lens element 5, the fourth lens element 6 and the fifth lens element 7 at the optical axis (I), i.e., the sum of G12, G23, G34, and G45; and
BFL represents a distance at the optical axis (I) between the image-side surface 72 of the fifth lens element 7 and the image plane 100 at the image side.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

Figures 5A, 5B, 5C, 5D:
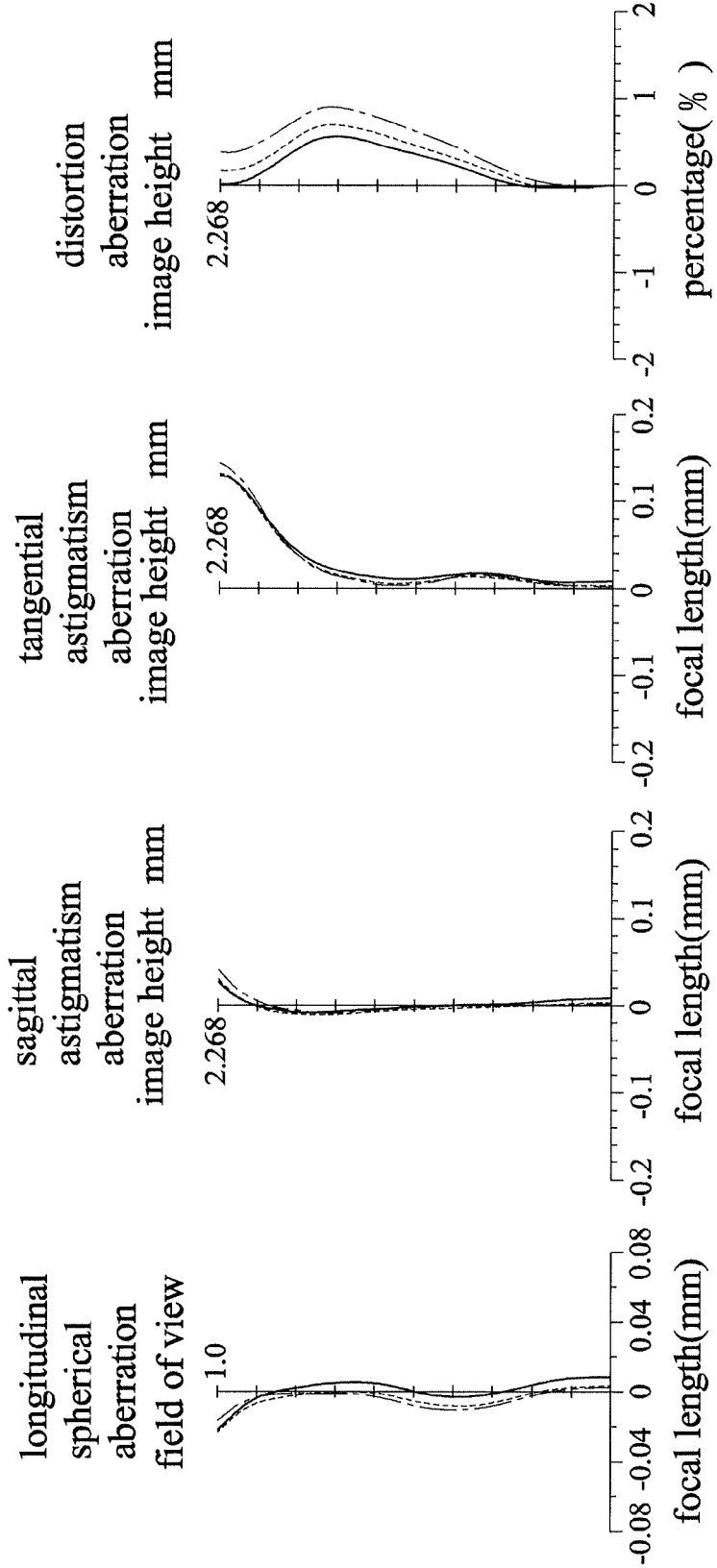
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.02 mm, the first preferred embodiment is able to achieve a relatively low spherical aberration at each of the wavelengths. Furthermore, since the curves at each field of view are close to each other, the first preferred embodiment has a relatively low chromatic aberration.

It can be understood from FIGS. 5(b) and 5(c) that, since each of the curves falls within the range of ±0.2 mm of focal length, the first preferred embodiment has a relatively low optical aberration.

Moreover, as shown in FIG. 5(d), since each of the curves corresponding to distortion aberration falls within the range of ±1%, the first preferred embodiment is able to meet requirements in imaging quality of most optical systems.

In view of the above, even with the system length reduced down to below 4.00 mm, the imaging lens 10 of the first preferred embodiment is still able to achieve a relatively good optical performance.

Figure 6:
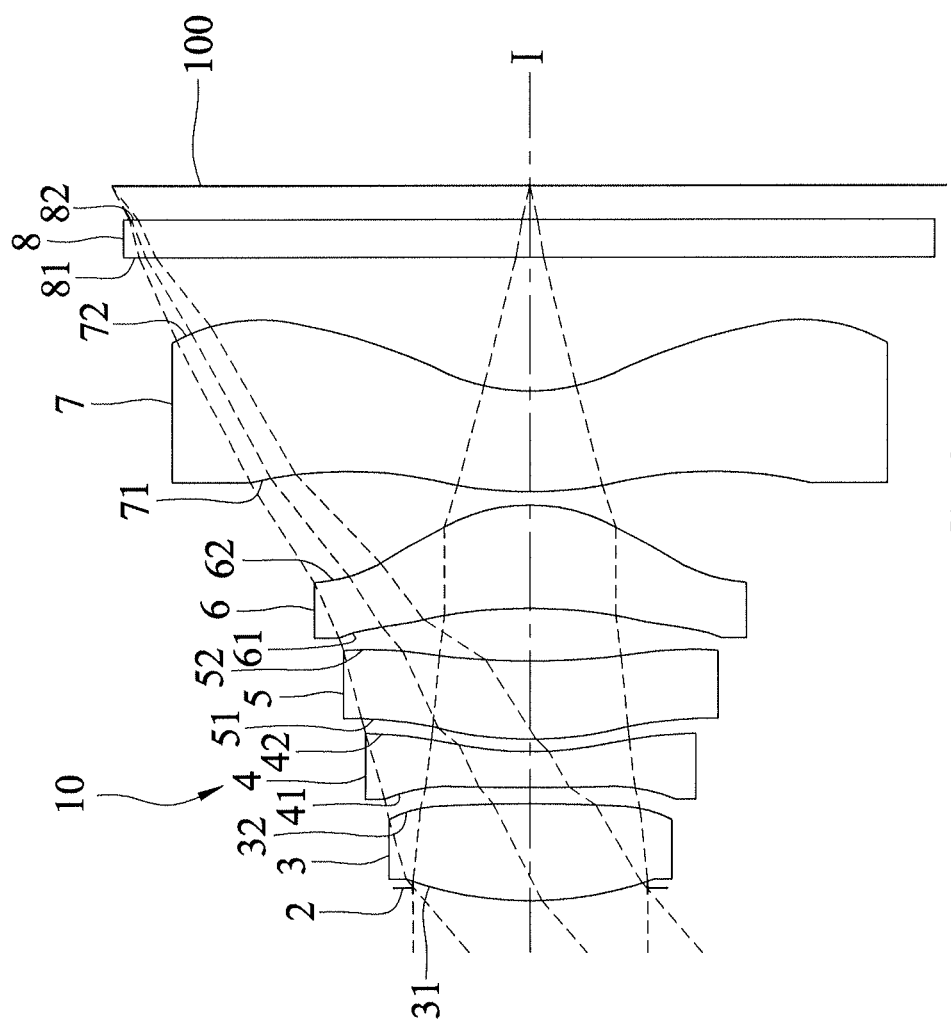
FIG. 6 is a schematic diagram that illustrates the second preferred embodiment of an imaging lens according to the present invention.
Figure 9:
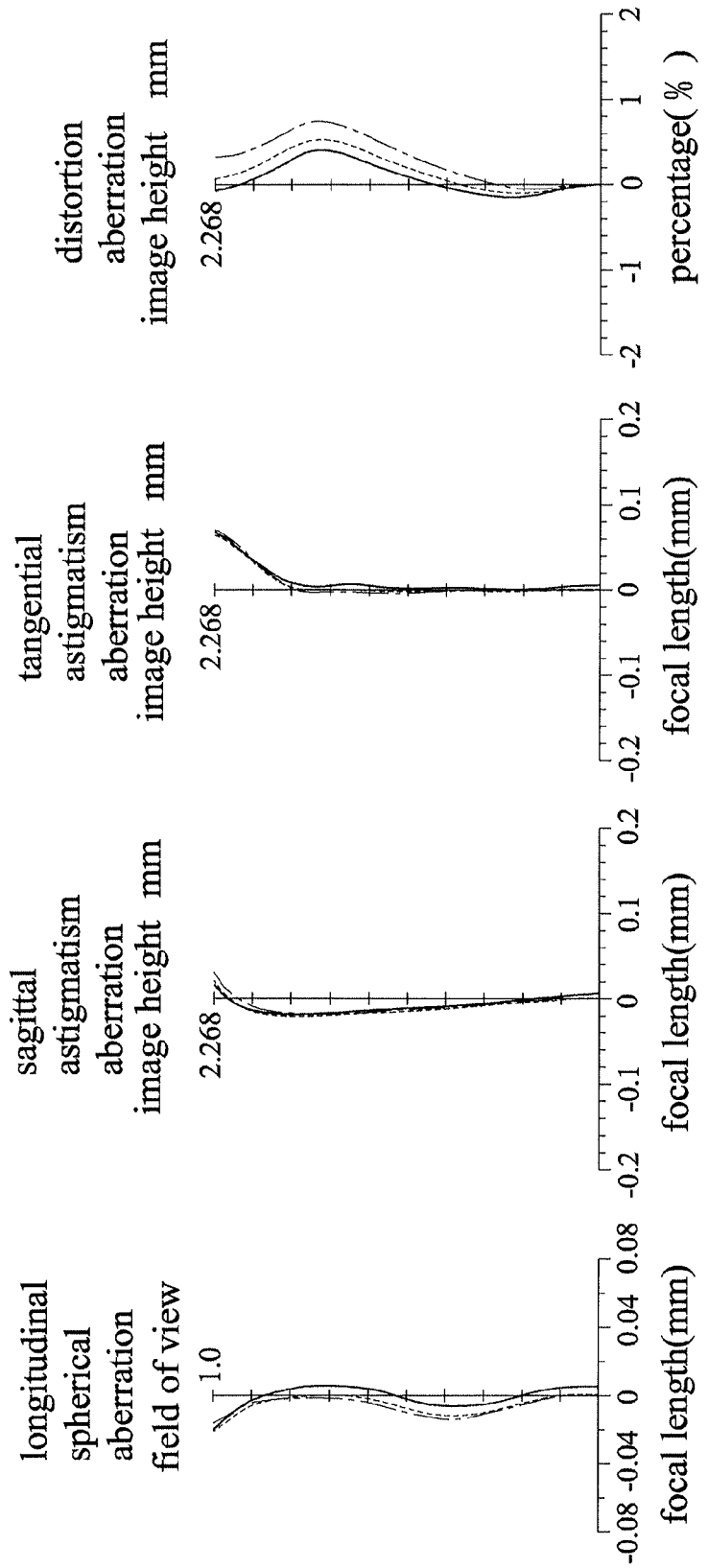
FIGS. 9(a) to 9(d) show different optical characteristics of the imaging lens of the second preferred embodiment.

Referring to FIG. 6, the differences between the first and second preferred embodiments of the imaging lens 10 of this invention reside in some of the optical data corresponding to the surfaces 31-81, 32-82, the lens parameters and the aspherical coefficients of the lens elements 3-7.

Shown in FIG. 7 is a table that lists values of some optical data corresponding to the surfaces 31-81, 32-82 of the second preferred embodiment. The imaging lens 10 has an overall system focal length of 2.6174 mm, an HFOV of 40.650°, an F-number of 2.05, and a system length of 3.8859 mm.

Shown in FIG. 8 is a table that lists values of some aspherical coefficients of the aforementioned relationship (1) corresponding to the second preferred embodiment.

Relationships among some of the aforementioned lens parameters corresponding to the second preferred embodiment are listed in a column of FIG. 30 corresponding to the second preferred embodiment.

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a) to 9(d) that the second preferred embodiment is able to achieve a relatively good optical performance.

Figure 10:
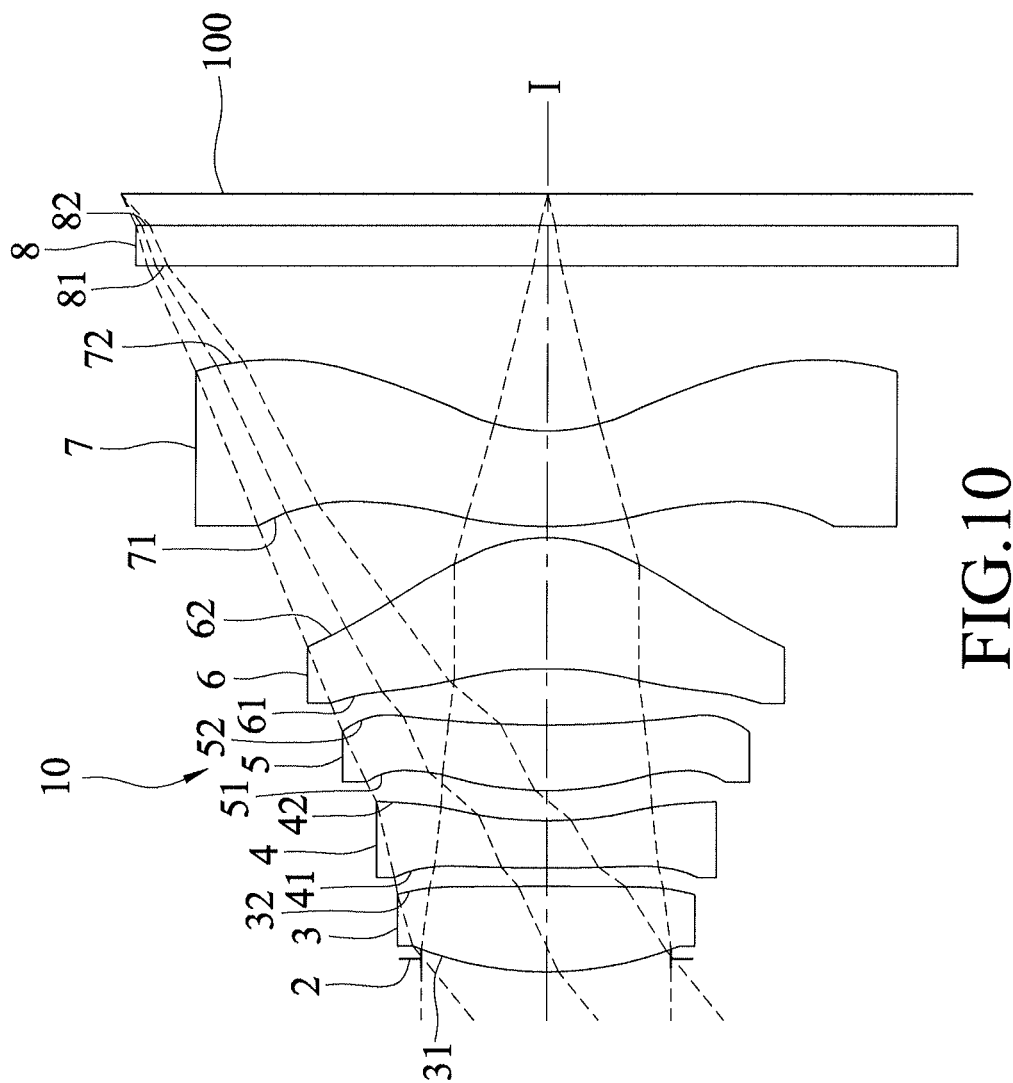
FIG. 10 is a schematic diagram that illustrates the third preferred embodiment of an imaging lens according to the present invention.
Figure 13:
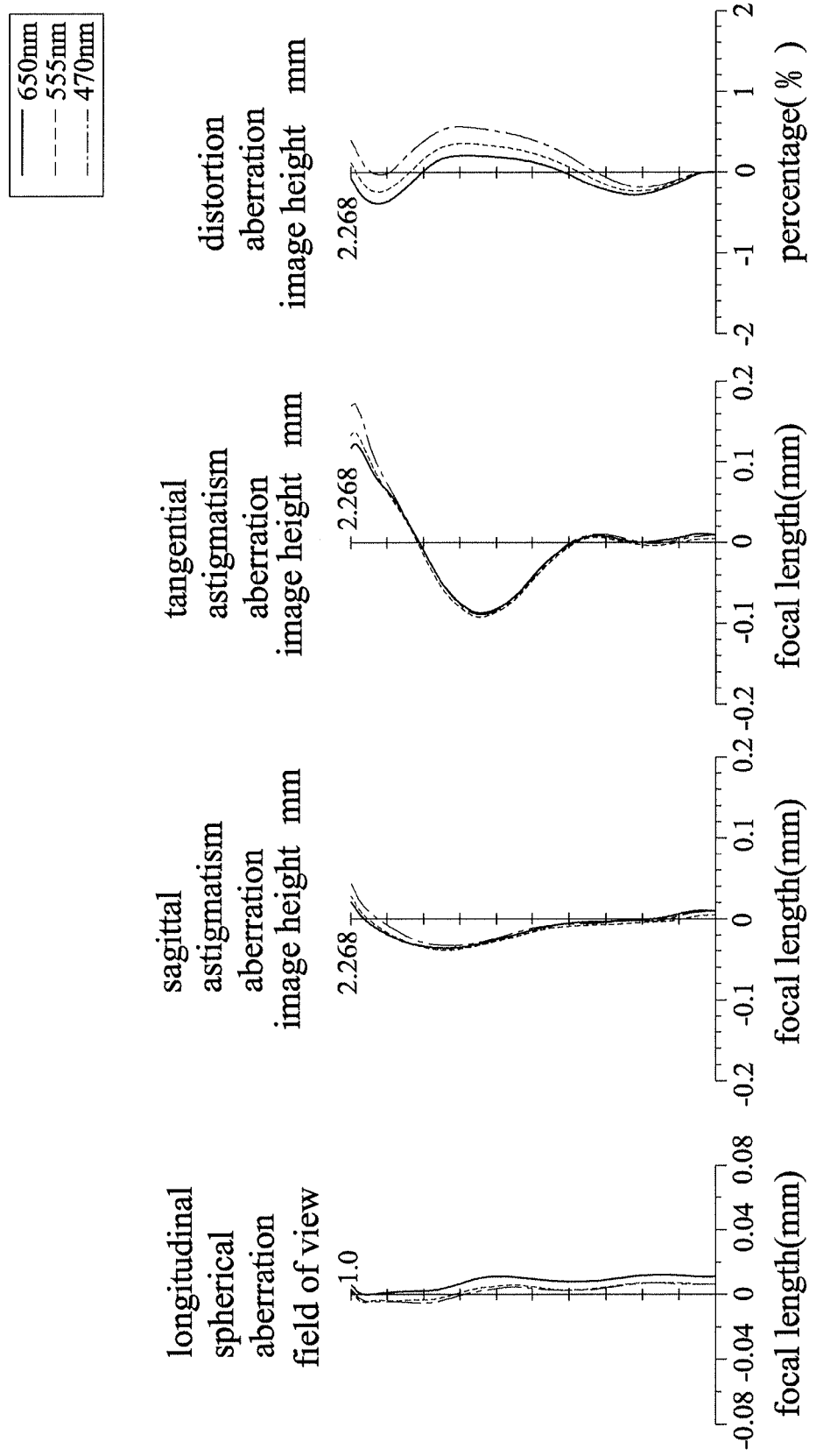
FIGS. 13(a) to 13(d) show different optical characteristics of the imaging lens of the third preferred embodiment.

Referring to FIG. 10, the differences between the first and third preferred embodiments of the imaging lens 10 of this invention reside in some of the optical data corresponding to the surfaces 31-81, 32-82, the lens parameters, and the aspherical coefficients of the lens elements 3-7.

Shown in FIG. 11 is a table that lists values of some optical data corresponding to the surfaces 31-81, 32-82 of the third preferred embodiment. The imaging lens 10 has an overall system focal length of 2.7389 mm, an HFOV of 39.421°, an F-number of 2.05, and a system length of 4.1354 mm.

Shown in FIG. 12 is a table that lists values of some aspherical coefficients of the aforementioned relationship (1) corresponding to the third preferred embodiment.

Relationships among some of the aforementioned lens parameters corresponding to the third preferred embodiment are listed in a column of FIG. 30 corresponding to the third preferred embodiment.

FIGS. 13(a) to 13(d) respectively show simulation results corresponding to longitudinal spherical aberration, sagittal astigmatism aberration, tangential astigmatism aberration, and distortion aberration of the third preferred embodiment. It can be understood from FIGS. 13(a) to 13(d) that the third preferred embodiment is able to achieve a relatively good optical performance.

Figure 14:
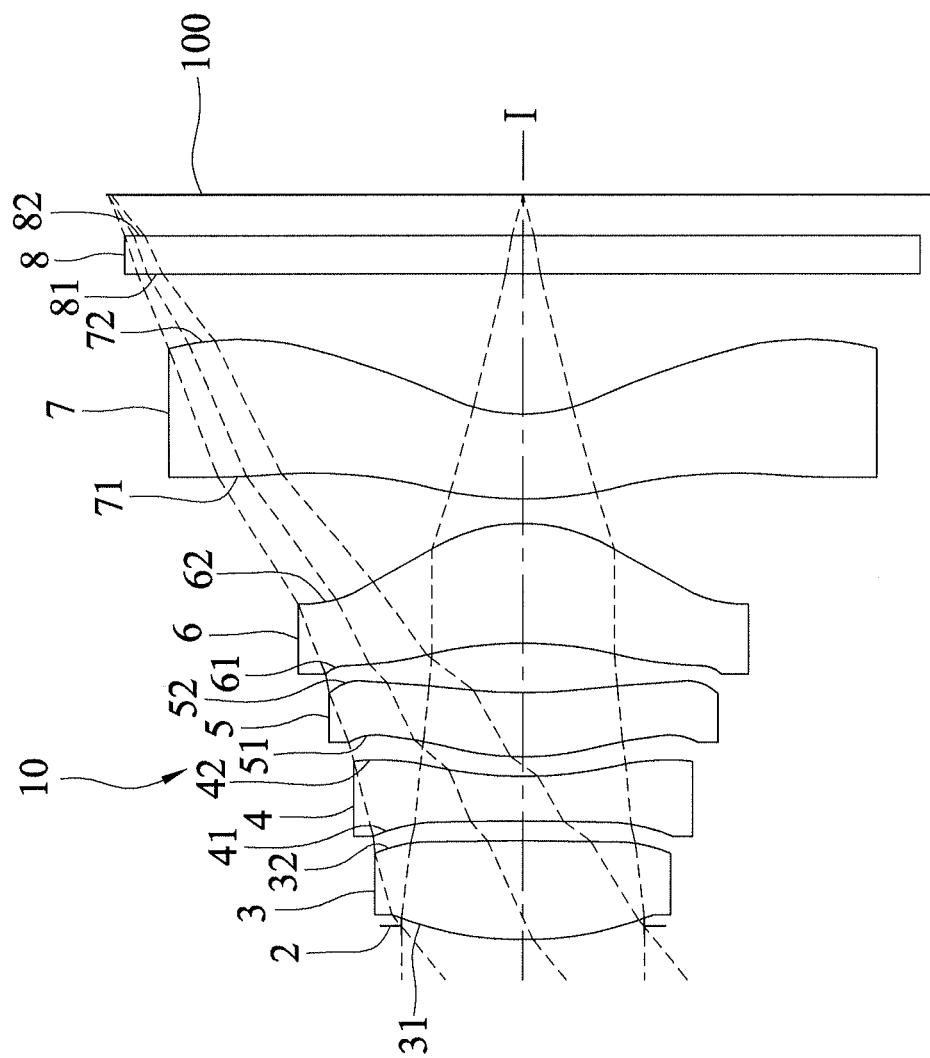
FIG. 14 is a schematic diagram that illustrates the fourth preferred embodiment of an imaging lens according to the present invention.
Figures 17A, 17B, 17C, 17D:
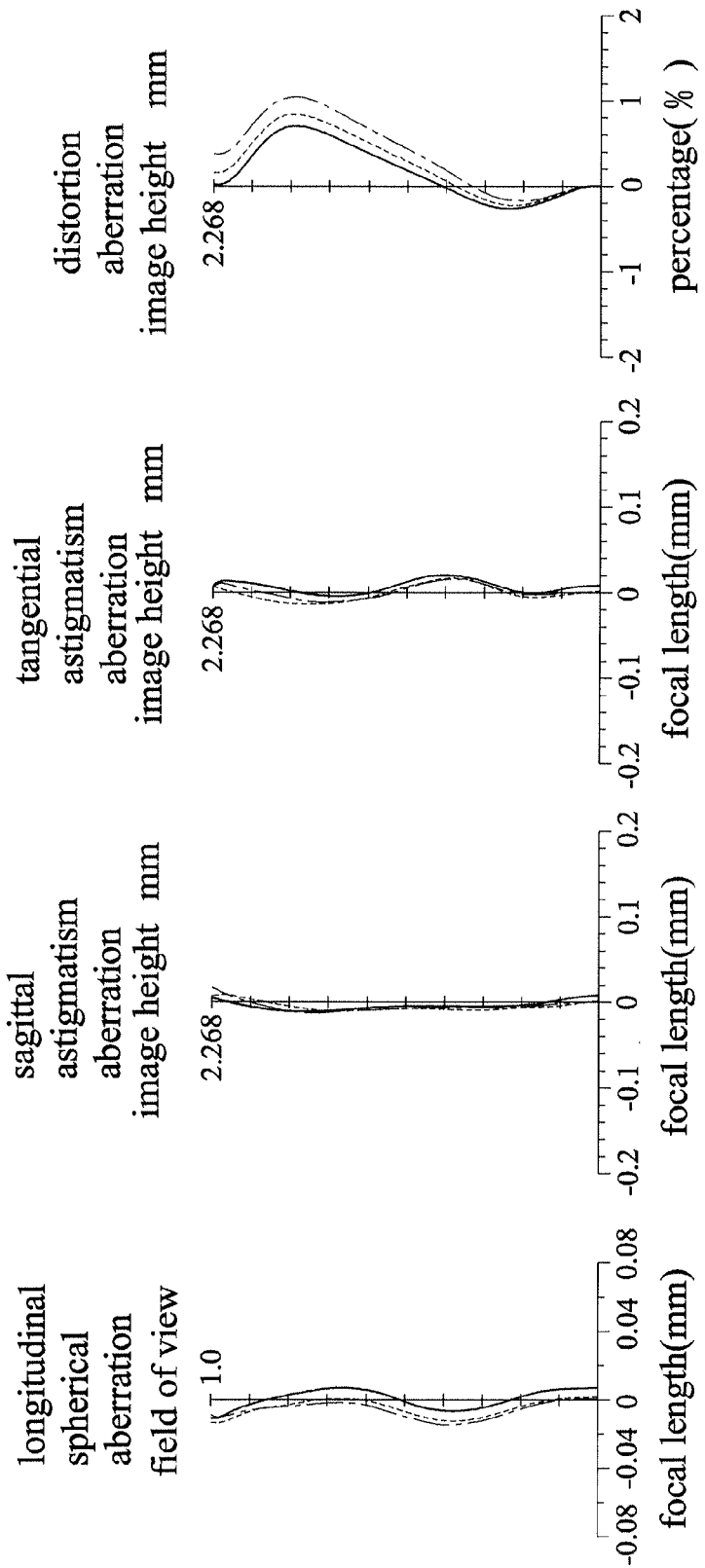
FIGS. 17(a) to 17(d) show different optical characteristics of the imaging lens of the fourth preferred embodiment.

Referring to FIG. 14, the differences between the first and fourth preferred embodiments of the imaging lens 10 of this invention reside in some of the optical data corresponding to the surfaces 31-81, 32-82, the lens parameters, and the aspherical coefficients of the lens elements 3-7.

Shown in FIG. 15 is a table that lists values of some optical data corresponding to the surfaces 31-81, 32-82 of the fourth preferred embodiment. The imaging lens 10 has an overall system focal length of 2.7359 mm, an HFOV of 39.385°, an F-number of 2.05, and a system length of 4.0700 mm.

Shown in FIG. 16 is a table that lists values of some aspherical coefficients of the aforementioned relationship (1) corresponding to the fourth preferred embodiment.

Relationships among some of the aforementioned lens parameters corresponding to the fourth preferred embodiment are listed in a column of FIG. 30 corresponding to the fourth preferred embodiment.

FIGS. 17(a) to 17(d) respectively show simulation results corresponding to longitudinal spherical aberration, sagittal astigmatism aberration, tangential astigmatism aberration, and distortion aberration of the fourth preferred embodiment. It can be understood from FIGS. 17(a) to 17(d) that the fourth preferred embodiment is able to achieve a relatively good optical performance.

Figure 18:
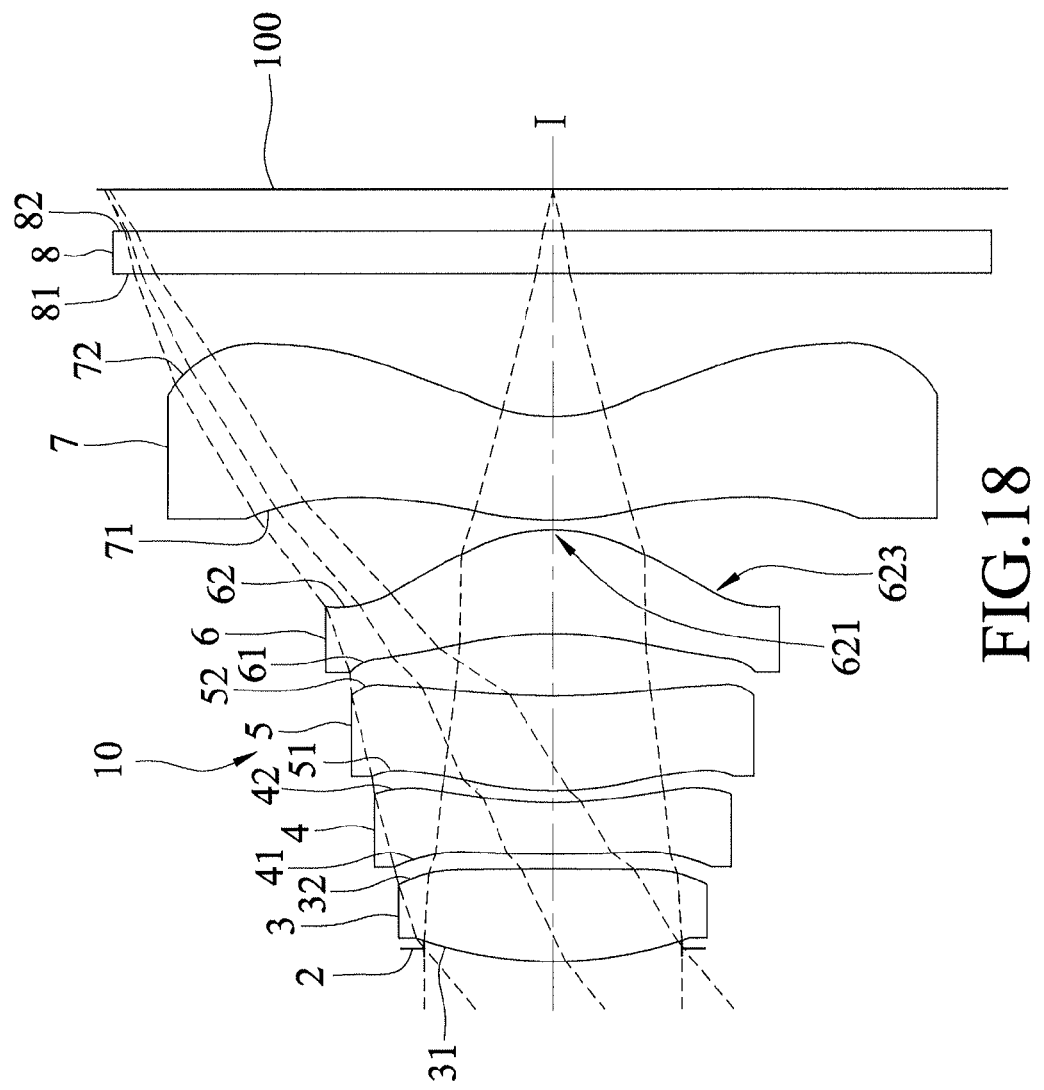
FIG. 18 is a schematic diagram that illustrates the fifth preferred embodiment of an imaging lens according to the present invention.
Figure 21:
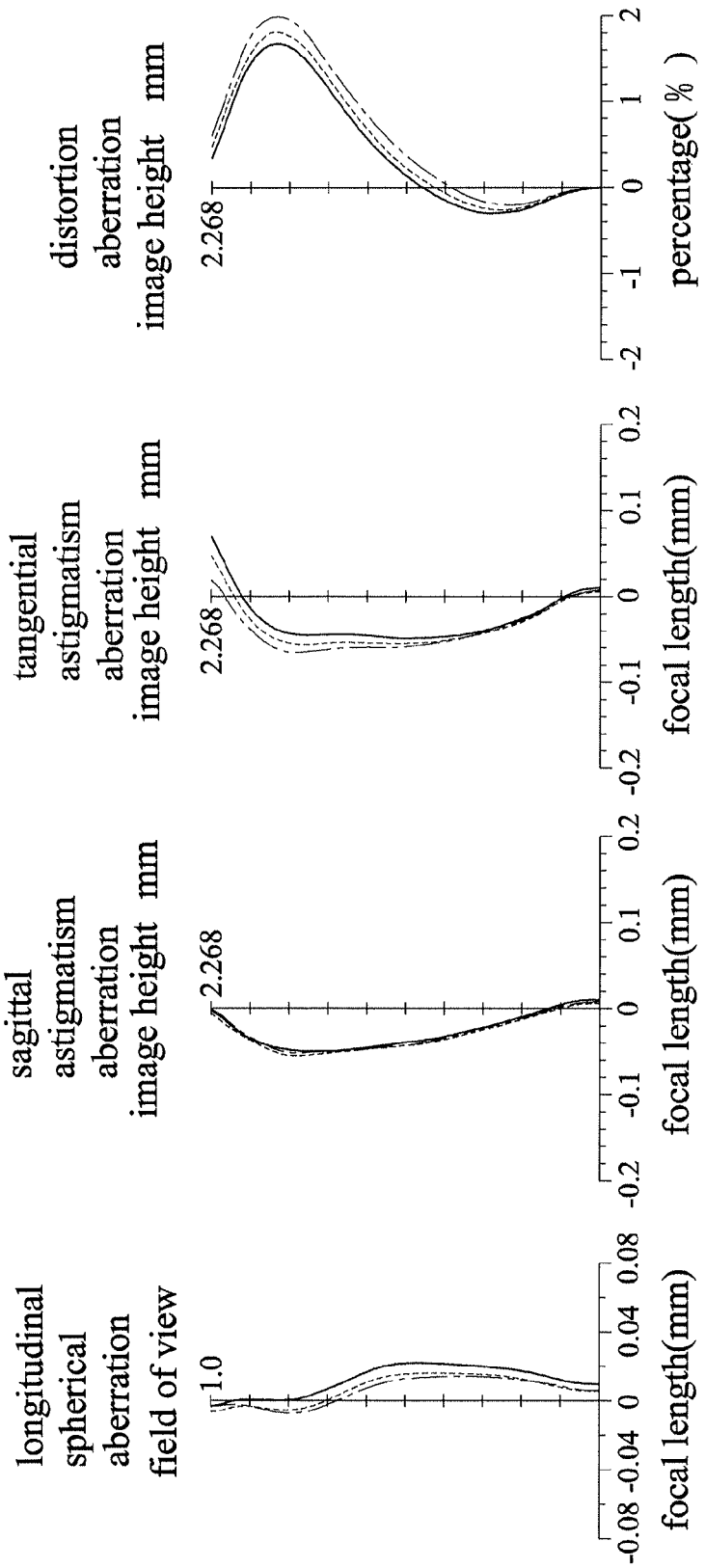
FIGS. 21(a) to 21(d) show different optical characteristics of the imaging lens of the fifth preferred embodiment.

Referring to FIG. 18, the differences between the first and fifth preferred embodiments of the imaging lens 10 of this invention reside in some of the optical data corresponding to the surfaces 31-81, 32-82, the lens parameters, and the aspherical coefficients of the lens elements 3-7. Besides, in the fifth preferred embodiment, the image-side surface 62 of the fourth lens element 6 has a convex portion 621 in a vicinity of the optical axis (I), and a concave portion 623 in a vicinity of a periphery of the fourth lens element 6.

Shown in FIG. 19 is a table that lists values of some optical data corresponding to the surfaces 31-81, 32-82 of the fifth preferred embodiment. The imaging lens 10 has an overall system focal length of 2.6899 mm, an HFOV of 39.812°, an F-number of 2.05, and a system length of 3.9004 mm.

Shown in FIG. 20 is a table that lists values of some aspherical coefficients of the aforementioned relationship (1) corresponding to the fifth preferred embodiment.

Relationships among some of the aforementioned lens parameters corresponding to the fifth preferred embodiment are listed in a column of FIG. 30 corresponding to the fifth preferred embodiment.

FIGS. 21(a) to 21(d) respectively show simulation results corresponding to longitudinal spherical aberration, sagittal astigmatism aberration, tangential astigmatism aberration, and distortion aberration of the fifth preferred embodiment. It can be understood from FIGS. 21(a) to 21(d) that the fifth preferred embodiment is able to achieve a relatively good optical performance.

Figure 22:
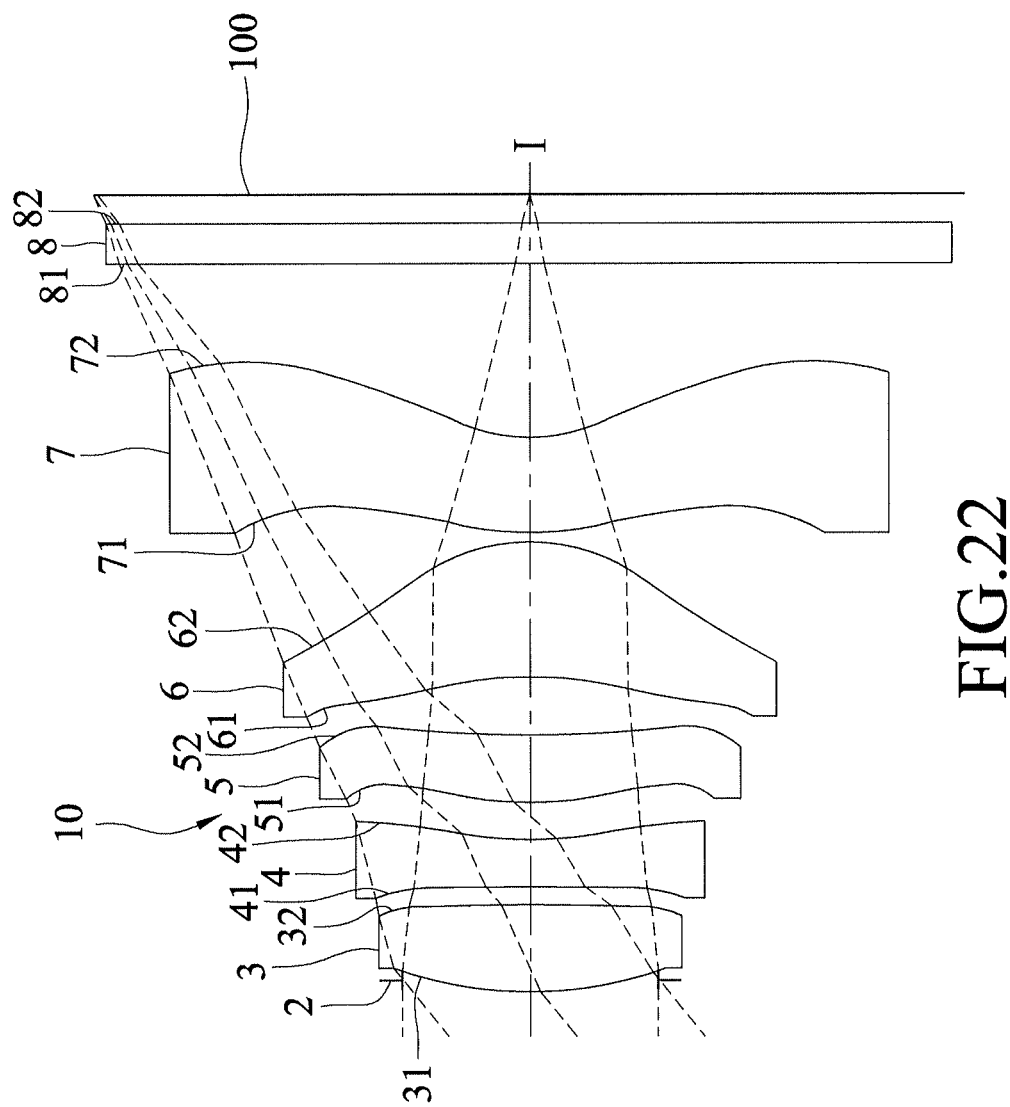
FIG. 22 is a schematic diagram that illustrates the sixth preferred embodiment of an imaging lens according to the present invention.
Figures 25A, 25B, 25C, 25D:
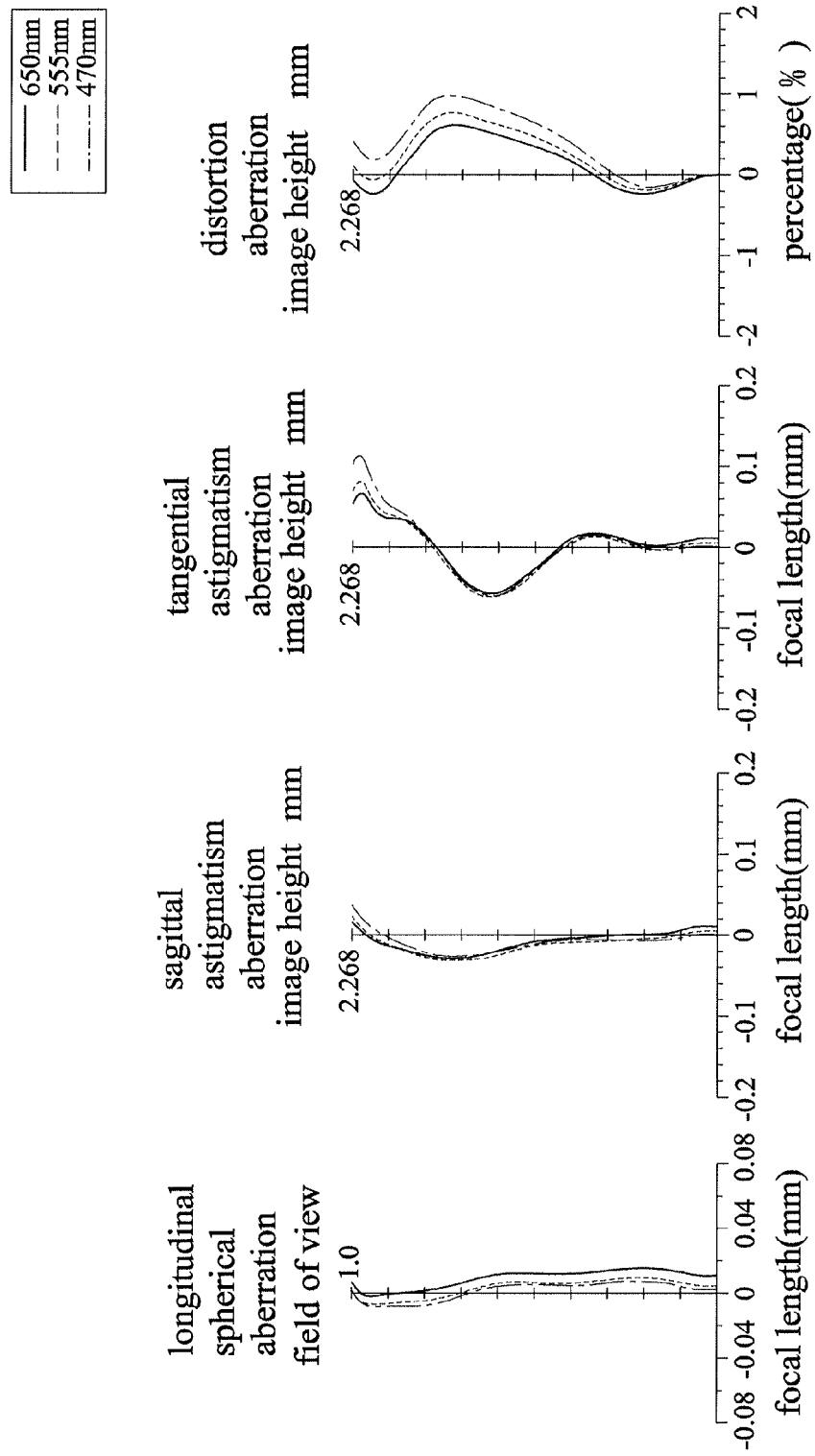
FIGS. 25(a) to 25(d) show different optical characteristics of the imaging lens of the sixth preferred embodiment.

Referring to FIG. 22, the differences between the first and sixth preferred embodiments of the imaging lens 10 of this invention reside in some of the optical data corresponding to the surfaces 31-81, 32-82, the lens parameters, and the aspherical coefficients of the lens elements 3-7.

Shown in FIG. 23 is a table that lists values of some optical data corresponding to the surfaces 31-81, 32-82 of the sixth preferred embodiment. The imaging lens 10 has an overall system focal length of 2.7384 mm, an HFOV of 39.418°, an F-number of 2.05, and a system length of 4.1644 mm.

Shown in FIG. 24 is a table that lists values of some aspherical coefficients of the aforementioned relationship (1) corresponding to the sixth preferred embodiment.

Relationships among some of the aforementioned lens parameters corresponding to the sixth preferred embodiment are listed in a column of FIG. 30 corresponding to the sixth preferred embodiment.

FIGS. 25(a) to 25(d) respectively show simulation results corresponding to longitudinal spherical aberration, sagittal astigmatism aberration, tangential astigmatism aberration, and distortion aberration of the sixth preferred embodiment. It can be understood from FIGS. 25(a) to 25(d) that the sixth preferred embodiment is able to achieve a relatively good optical performance.

Figure 26:
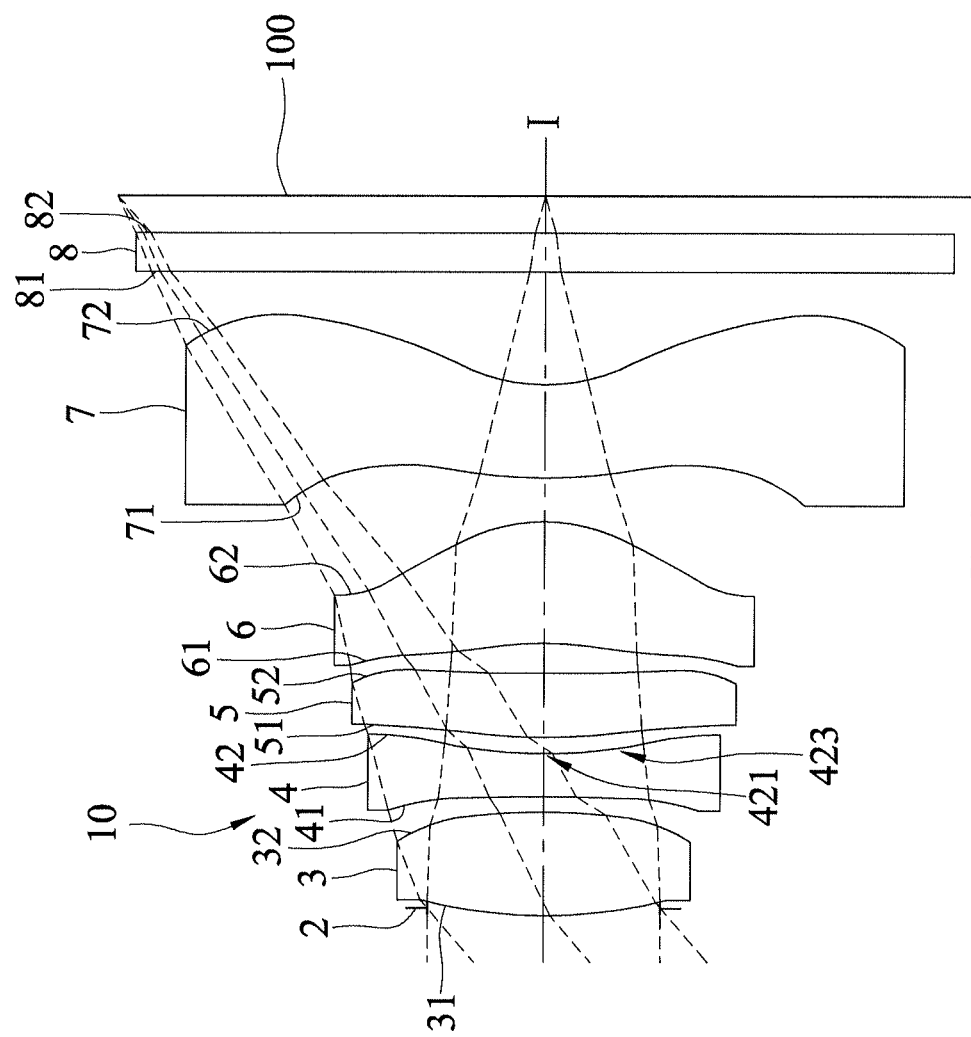
FIG. 26 is a schematic diagram that illustrates the seventh preferred embodiment of an imaging lens according to the present invention.
Figure 29:
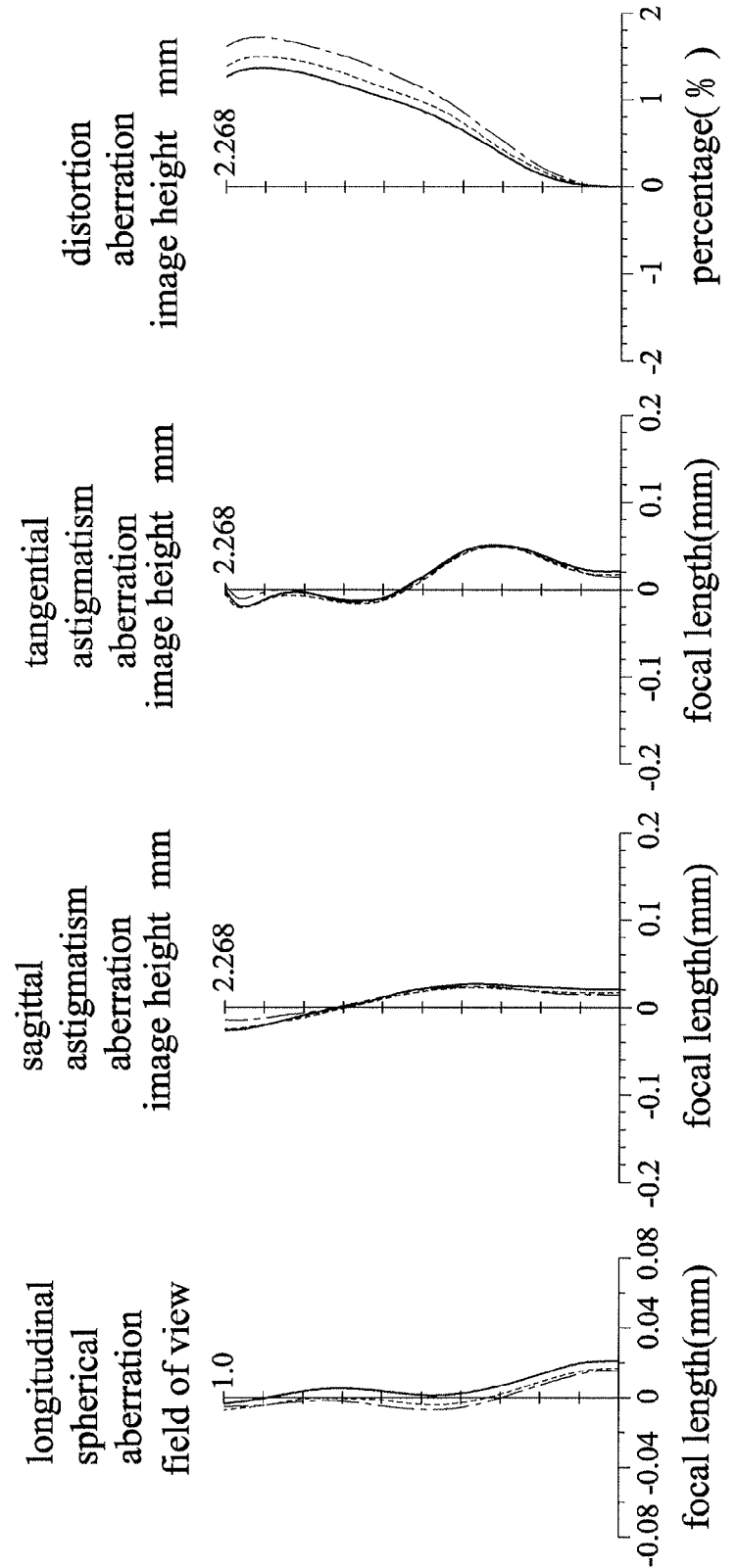
FIGS. 29(a) to 29(d) show different optical characteristics of the imaging lens of the seventh preferred embodiment.

FIG. 26 illustrates the seventh preferred embodiment of an imaging lens 10 according to the present invention, which has a configuration similar to that of the first preferred embodiment. However, in this seventh preferred embodiment, the image-side surface 42 of the second lens element 4 has a concave portion 421 in a vicinity of the optical axis (I), and a concave portion 423 in a vicinity of a periphery of the second lens element 4.

Shown in FIG. 27 is a table that lists values of some optical data corresponding to the surfaces 31-81, 32-82 of the seventh preferred embodiment. The imaging lens 10 has an overall system focal length of 2.5570 mm, an HFOV of 41.121°, an F-number of 2.05, and a system length of 3.8139 mm.

Shown in FIG. 28 is a table that lists values of some aspherical coefficients of the aforementioned relationship (1) corresponding to the seventh preferred embodiment.

Relationships among some of the aforementioned lens parameters corresponding to the seventh preferred embodiment are listed in a column of FIG. 30 corresponding to the seventh preferred embodiment.

FIGS. 29(a) to 29(d) respectively show simulation results corresponding to longitudinal spherical aberration, sagittal astigmatism aberration, tangential astigmatism aberration, and distortion aberration of the seventh preferred embodiment. It can be understood from FIGS. 29(a) to 29(d) that the seventh preferred embodiment is able to achieve a relatively good optical performance.

Shown in FIG. 30 is a table that lists the aforesaid relationships among some of the aforementioned lens parameters corresponding to the seven preferred embodiments for comparison. It should be noted that the values of the lens parameters and the relationships listed in FIG. 30 are rounded off to the third decimal place.

When each of the lens parameters of the imaging lens 10 according to this invention satisfies the following optical relationships, the optical performance is still relatively good even with the reduced system length:

1. T4/G34≥1.60 and T3/G34≥1.10: In order to reduce the overall system length of the imaging lens 10, reductions in T3, T4 and G34 are advantageous. However, although G34 is readily reduced, reductions in T3 and T4 are limited due to manufacturing ability. In design, there is a tendency to have relatively larger values of T4/G34 and T3/G34. Better arrangement may be achieved when these relationships are satisfied. Preferably, 1.6≤T4/G34≤5.0 and 1.1≤T3/G34≤2.5.

2. T3/G23≥1.80, T2/G23≥1.20, T1/G23≥2.80, T4/G23≥3.00, T5/G23≥2.55 and ALT/G23≥11.00: Similar to the above, reductions in T1, T2, T3, T4, T5 and ALT are limited, while G23 should be reduced as much as possible for reduction of the overall system length of the imaging lens 10. Therefore, there is a tendency to have relatively larger values of T3/G23, T2/G23, T1/G23, T4/G23, T5/G23 and ALT/G23 in design. Better arrangement may be achieved when these relationships are satisfied. Preferably, 1.8≤T3/G23≤9.0, 1.2≤T2/G23≤5.0, 2.8≤T1/G23≤10.0, 2.55≤T5/G23≤12.0, 3.0T4/G23≤12.0 and 11.0≤ALT/G23≤50.0.

3. T1/Gaa≥0.65 and Gaa/T2≤3.00: Similar to the above aforesaid, Gaa should be reduced as much as possible for reduction of the overall system length of the imaging lens 10. Therefore, T1/Gaa tends to have a relatively larger value, and Gaa/T2 tends to have a relatively smaller value in design. Better arrangement may be achieved when these relationships are satisfied. Preferably, 0.65≤T1/Gaa≤1.1 and 1.8≤Gaa/T2≤3.0.

4. T5/T4≥0.70, ALT/T1≤5.00 and BFL/T5≤3.00: In order to prevent any one of the lens elements 3-7 from being too thick that disfavors reduction of the overall system length, and from being too thin that disfavors lens manufacture, T5/T4, ALT/T1 and BFL/T5 should be maintained at appropriate relationships, respectively. Better arrangement may be achieved when these relationships are satisfied. Preferably, 0.7≤T5/T4≤1.2, 4.0≤ALT/T1≤5.0 and 1.5≤BFL/T5≤3.0.

5. BFL/(G12+G45)≥3.00, (G12+G45)/G23≤4.00 and Gaa/(G12+G45)≥2.50: Since the image-side surface 62 of the fourth lens element 6 has the convex portion 621 in the vicinity of the optical axis (I) and the object-side surface 71 of the fifth lens element 7 has the convex portion 711 in the vicinity of the optical axis (I), G45 can be reduced as much as possible in comparison with other air gap widths. In design, BFL/(G12+G45) and Gaa/(G12+G45) tend to have relatively larger values, and (G12+G45)/G23 tends to have a relatively smaller value. Better arrangement may be achieved when these relationships are satisfied. Preferably, 3.0≤BFL/(G12+G45)≤10.0, 0.5≤(G12+G45)/G23≤4.0 and 2.5≤Gaa/(G12+G45)≤5.0.

To sum up, effects and advantages of the imaging lens 10 according to the present invention are described hereinafter.

1. The positive refractive power of the first lens element 3 contributes to the overall positive refractive power of the imaging lens 10. The negative refractive power of the second lens element 2 is effective to correct image aberration. In addition, by virtue of the aperture stop 2 arranged in front of the object-side surface 31 of the first lens element 3, converging ability may be enhanced, and the overall length of the imaging lens 10 may be reduced.

2. Through design of the relevant optical parameters, optical aberrations, such as spherical aberration, may be reduced or even eliminated. Moreover, by cooperation of the convex object-side surface 31 that favors collecting imaging lights, the concave portion 412, the concave portion 521, the concave portion 611, the convex portion 621, the convex portion 711, the concave portion 721 and the convex portion 722, image quality may be enhanced.

3. Through the aforesaid seven preferred embodiments, it is known that the system length of this invention may be reduced down to below 4.2 mm, so as to facilitate developing thinner relevant products with economic benefits.

Figure 31:
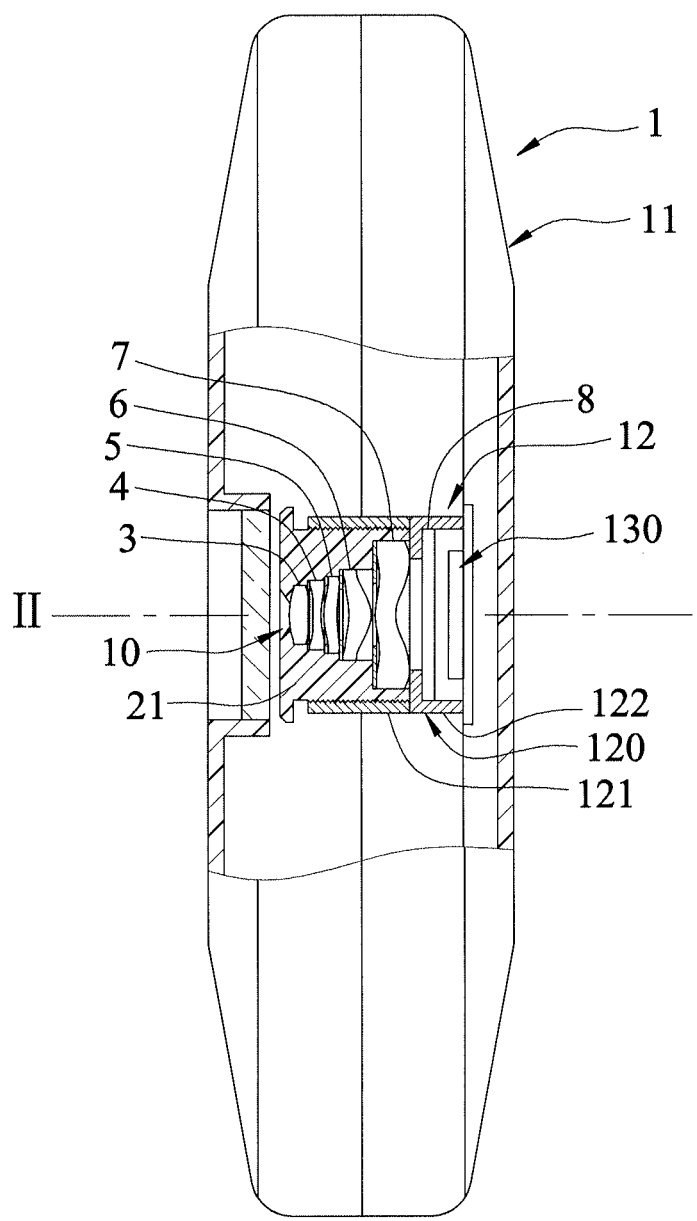
FIG. 31 is a schematic partly sectional view to illustrate a first exemplary application of the imaging lens of the present invention.

Shown in FIG. 31 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1.

The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 32:
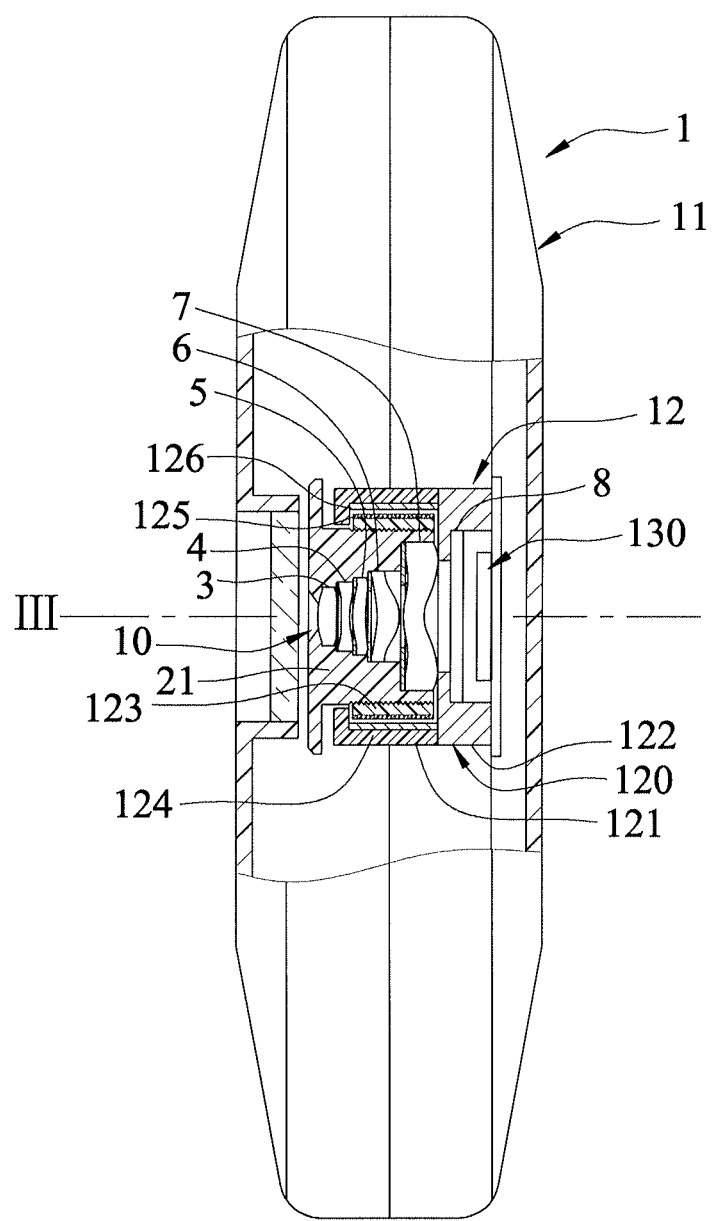
FIG. 32 is a schematic partly sectional view to illustrate a second exemplary application of the imaging lens of the present invention.

Shown in FIG. 32 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop, a first lens element, a second lens element, a third lens element, a fourth lens element and a fifth lens element arranged in order from an object side to an image side along an optical axis of said imaging lens, each of said first lens element, said second lens element, said third lens element, said fourth lens element and said fifth lens element having a refractive power, an object-side surface facing toward the object side, and an image-side surface facing toward the image side, wherein:

said first lens element has a positive refractive power, and said object-side surface of said first lens element is a convex surface that has a convex portion in a vicinity of the optical axis and a convex portion in a vicinity of a periphery of said first lens element;

said second lens element has a negative refractive power, and said object-side surface of said second lens element has a concave portion in a vicinity of a periphery of said second lens element;

said image-side surface of said third lens element has a concave portion in a vicinity of the optical axis;

said object-side surface of said fourth lens element has a concave portion in a vicinity of a periphery of said fourth lens element, said fourth lens element has a positive refractive power, and said image-side surface of said fourth lens element has a convex portion in a vicinity of the optical axis;

said object-side surface of said fifth lens element has a convex portion in a vicinity of the optical axis, and said image-side surface of said fifth lens element has a concave portion in a vicinity of the optical axis, and a convex portion in a vicinity of a periphery of said fifth lens element;

said imaging lens does not include any lens element with a refractive power other than said first lens element, said second lens element, said third lens element, said fourth lens element and said fifth lens element;

said imaging lens satisfies T4/G34≥1.60, where T4 represents a thickness of said fourth lens element at the optical axis, and G34 represents an air gap width between said third lens element and said fourth lens element at the optical axis; and said imaging lens further satisfies T4/G23≥3.00, where G23 represents an air gap width between said second lens element and said third lens element at the optical axis.

2. The imaging lens as claimed in claim 1, further satisfying T5/T4≥0.70, where T5 represents a thickness of said fifth lens element at the optical axis.

3. The imaging lens as claimed in claim 2, further satisfying T3/G23≥1.80, where T3 represents a thickness of said third lens element at the optical axis.

4. The imaging lens as claimed in claim 3, further satisfying T1/Gaa≥0.65, where T1 represents a thickness of said first lens element at the optical axis, and Gaa represents a sum of four air gap widths among said first lens element, said second lens element, said third lens element, said fourth lens element and said fifth lens element at the optical axis.

5. The imaging lens as claimed in claim 3, further satisfying T2/G23≥1.20, where T2 represents a thickness of said second lens element at the optical axis.

6. The imaging lens as claimed in claim 5, further satisfying ALT/T1≤5.00, where T1 represents a thickness of said first lens element at the optical axis, and ALT represents a sum of thicknesses of said first lens element, said second lens element, said third lens element, said fourth lens element and said fifth lens element at the optical axis.

7. The imaging lens as claimed in claim 1, further satisfying BFL/(G12+G45)≥3.00, where BFL represents a distance at the optical axis between said image-side surface of said fifth lens element and an image plane at the image side, G12 represents an air gap width between said first lens element and said second lens element at the optical axis, and G45 represents an air gap width between said fourth lens element and said fifth lens element at the optical axis.

8. The imaging lens as claimed in claim 7, further satisfying T3/G34≥1.10, where T3 represents a thickness of said third lens element at the optical axis.

9. The imaging lens as claimed in claim 8, further satisfying T1/G23≥2.80, where T1 represents a thickness of said first lens element at the optical axis.

10. The imaging lens as claimed in claim 9, further satisfying (G12+G45)/G23≥4.00.

11. The imaging lens as claimed in claim 9, further satisfying BFL/T5≤3.00, where T5 represents a thickness of said fifth lens element at the optical axis.

12. The imaging lens as claimed in claim 1, further satisfying T3/G23≥1.80, where T3 represents a thickness of said third lens element at the optical axis.

13. The imaging lens as claimed in claim 12, further satisfying Gaa/(G12+G45)≥2.50, where Gaa represents a sum of four air gap widths among said first lens element, said second lens element, said third lens element, said fourth lens element and said fifth lens element at the optical axis, G12 represents the air gap width between said first lens element and said second lens element at the optical axis, and G45 represents the air gap width between said fourth lens element and said fifth lens element at the optical axis.

14. The imaging lens as claimed in claim 13, further satisfying T5/G23≥2.55, where T5 represents a thickness of said fifth lens element at the optical axis.

15. The imaging lens as claimed in claim 13, further satisfying Gaa/T2≤3.00, where T2 represents a thickness of said second lens element at the optical axis.

16. The imaging lens as claimed in claim 1, further satisfying T3/G34≥1.10, where T3 represents a thickness of said third lens element at the optical axis.

17. The imaging lens as claimed in claim 16, further satisfying T5/T4≥0.70, where T5 represents a thickness of said fifth lens element at the optical axis.

18. The imaging lens as claimed in claim 17, further satisfying ALT/G23≥11.00, where ALT represents a sum of thicknesses of said first lens element, said second lens element, said third lens element, said fourth lens element and said fifth lens element at the optical axis.

19. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *